(12) United States Patent
Johnson et al.

(10) Patent No.: US 7,115,150 B2
(45) Date of Patent: Oct. 3, 2006

(54) MIST FILTRATION ARRANGEMENT UTILIZING FINE FIBER LAYER IN CONTACT WITH MEDIA HAVING A PLEATED CONSTRUCTION AND FLOOR FILTER METHOD

(75) Inventors: Bruce A. Johnson, Lake Elmo, MN (US); Mark A. Gogins, Roseville, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 214 days.

(21) Appl. No.: 10/184,015

(22) Filed: Jun. 26, 2002

(65) Prior Publication Data

US 2003/0010002 A1    Jan. 16, 2003

Related U.S. Application Data

(63) Continuation-in-part of application No. 09/871,583, filed on May 31, 2001, and a continuation-in-part of application No. 09/871,156, filed on May 31, 2001.

(60) Provisional application No. 60/230,138, filed on Sep. 5, 2000.

(51) Int. Cl.
    *B01D 46/00*     (2006.01)
    *B01D 39/16*     (2006.01)

(52) U.S. Cl. .............................. 55/486; 55/487; 55/495; 55/497; 55/498; 55/521; 55/527; 55/528; 55/DIG. 17

(58) Field of Classification Search .................. 55/482, 55/486, 487, 527, 528, 529, 385.1, 385.3, 55/DIG. 17, 495, 497, 498, 521; 442/36
See application file for complete search history.

(56) References Cited

U.S. PATENT DOCUMENTS

| | | | |
|---|---|---|---|
| 2,835,341 | A | 5/1958 | Parker, Jr. |
| 2,980,204 | A | 4/1961 | Jordan |
| 3,102,793 | A | 9/1963 | Alban |
| 3,236,679 | A | 2/1966 | Spiller et al. |
| 3,251,475 | A | 5/1966 | Till et al. |
| 3,258,900 | A | 7/1966 | Harms |
| 3,360,598 | A | 12/1967 | Earnhart |
| 3,565,979 | A | 2/1971 | Palmer |
| 3,570,675 | A | 3/1971 | Pall et al. |
| 3,591,010 | A | 7/1971 | Pall et al. |
| 3,689,608 | A | 9/1972 | Hollberg et al. |
| 3,745,748 | A | 7/1973 | Goldfield et al. |
| 3,755,527 | A | 8/1973 | Keller et al. |
| 3,772,136 | A | 11/1973 | Workman |

(Continued)

FOREIGN PATENT DOCUMENTS

EP     0 489 395 A1     9/1992

(Continued)

OTHER PUBLICATIONS

Adanur, S. et al., "Recovery and Reuse of Waste PVC Coated Fabrics. Part 1: Experimental Procedures and Separation of Fabric Components", *Jour of Coated Fabrics*, vol. 28, pp. 37-55 (Jul. 1998).

(Continued)

*Primary Examiner*—Jason M. Greene
(74) *Attorney, Agent, or Firm*—Merchant & Gould P.C.

(57) ABSTRACT

Filter arrangements for mist removal include a barrier media, usually pleated, and treated with a deposit of fine fibers. Filter arrangements may take the form of tubular, radially sealing elements; tubular, axial sealing elements; forward flow air cleaners; reverse flow air cleaners; and panel filters and can have multiple layers of fine fiber containing pleated media.

43 Claims, 7 Drawing Sheets

U.S. PATENT DOCUMENTS

| | | |
|---|---|---|
| 3,825,380 A | 7/1974 | Harding et al. |
| 3,839,529 A | 10/1974 | Serres et al. |
| 3,851,023 A | 11/1974 | Brethauer et al. |
| 3,888,610 A | 6/1975 | Brackmann et al. |
| 3,994,258 A | 11/1976 | Simm |
| 4,011,067 A | 3/1977 | Carey, Jr. |
| 4,020,230 A | 4/1977 | Mahoney et al. |
| 4,032,688 A | 6/1977 | Pall |
| 4,070,519 A | 1/1978 | Lefkowitz et al. |
| 4,143,196 A | 3/1979 | Simm et al. |
| 4,148,595 A | 4/1979 | Bednarz |
| 4,210,615 A | 7/1980 | Engler et al. |
| 4,215,682 A | 8/1980 | Kubik et al. |
| 4,223,101 A | 9/1980 | Fine et al. |
| 4,230,650 A | 10/1980 | Guignard |
| 4,278,623 A | 7/1981 | Niegisch |
| 4,290,987 A | 9/1981 | Soehngen et al. |
| 4,323,525 A | 4/1982 | Bornat |
| 4,340,479 A | 7/1982 | Pall |
| 4,370,290 A | 1/1983 | Makino et al. |
| 4,468,428 A | 8/1984 | Early et al. |
| 4,469,606 A | 9/1984 | Reid et al. |
| 4,476,186 A | 10/1984 | Kato et al. |
| 4,594,162 A | 6/1986 | Berger |
| 4,650,506 A * | 3/1987 | Barris et al. ............... 55/487 |
| 4,689,186 A | 8/1987 | Bornat |
| 4,824,451 A | 4/1989 | Vogt et al. |
| 4,826,519 A | 5/1989 | Miyagi et al. |
| 4,842,505 A | 6/1989 | Annis et al. |
| 4,842,924 A | 6/1989 | Farris et al. |
| 4,849,474 A * | 7/1989 | Gallucci ............... 525/92 B |
| 4,874,399 A | 10/1989 | Reed et al. |
| 4,900,671 A | 2/1990 | Pokora et al. |
| 4,915,886 A | 4/1990 | Repetti et al. |
| 4,917,942 A | 4/1990 | Winters |
| 4,929,502 A | 5/1990 | Giglia |
| 4,992,515 A | 2/1991 | Ballard |
| 5,082,476 A | 1/1992 | Kahlbaugh et al. |
| 5,104,532 A | 4/1992 | Sufelman et al. |
| 5,166,246 A | 11/1992 | Gallucci et al. |
| 5,176,952 A | 1/1993 | Joseph et al. |
| 5,198,294 A | 3/1993 | Masuda et al. |
| 5,203,201 A | 4/1993 | Gogins |
| 5,238,735 A | 8/1993 | Nagou et al. |
| 5,269,925 A | 12/1993 | Broadhurst |
| 5,273,565 A | 12/1993 | Milligan et al. |
| 5,306,534 A | 4/1994 | Bosses |
| 5,358,638 A | 10/1994 | Gershenson |
| 5,364,456 A | 11/1994 | Kahlbaugh et al. |
| 5,411,576 A | 5/1995 | Jones et al. |
| 5,415,676 A | 5/1995 | Tokar et al. |
| 5,437,910 A | 8/1995 | Raabe et al. |
| 5,454,858 A | 10/1995 | Tokar et al. |
| 5,472,481 A | 12/1995 | Jones et al. |
| 5,496,507 A | 3/1996 | Angadjivand et al. |
| 5,593,768 A | 1/1997 | Gessner |
| 5,597,645 A | 1/1997 | Pike et al. |
| 5,605,748 A * | 2/1997 | Kennedy et al. ............... 55/486 |
| 5,633,746 A | 5/1997 | Sekiya et al. |
| 5,672,399 A * | 9/1997 | Kahlbaugh et al. ............ 55/527 |
| 5,763,078 A | 6/1998 | Braun et al. |
| 5,800,586 A | 9/1998 | Cusick et al. |
| 5,820,646 A | 10/1998 | Gillingham et al. |
| 5,853,442 A | 12/1998 | Glen et al. |
| 5,863,701 A | 1/1999 | Mertesdorf |
| 5,871,557 A | 2/1999 | Tokar et al. |
| 5,908,598 A | 6/1999 | Rousseau et al. |
| 5,919,847 A | 7/1999 | Rousseau et al. |
| 5,935,284 A | 8/1999 | Tokar et al. |
| 5,948,344 A | 9/1999 | Cusick et al. |
| 5,954,849 A | 9/1999 | Berkhoel et al. |
| 5,968,635 A | 10/1999 | Rousseau et al. |
| 5,976,208 A | 11/1999 | Rousseau et al. |
| 5,980,755 A | 11/1999 | Roberts et al. |
| 5,980,759 A | 11/1999 | Proulx et al. |
| 5,993,501 A | 11/1999 | Cusick et al. |
| 6,002,017 A | 12/1999 | Rousseau et al. |
| 6,007,608 A | 12/1999 | Johnson |
| 6,032,807 A | 3/2000 | Sternberg et al. |
| 6,048,661 A | 4/2000 | Nishi et al. |
| D425,189 S | 5/2000 | Gillingham et al. |
| 6,068,799 A | 5/2000 | Rousseau et al. |
| 6,156,086 A | 12/2000 | Zhang |
| 6,171,684 B1 | 1/2001 | Kahlbaugh et al. |
| 6,183,536 B1 | 2/2001 | Schultink et al. |
| 6,193,773 B1 | 2/2001 | Schlor et al. |
| 6,322,604 B1 | 11/2001 | Midkiff |
| 6,355,079 B1 | 3/2002 | Sorvari et al. |
| 6,395,046 B1 * | 5/2002 | Emig et al. ............... 55/487 |
| 6,554,881 B1 * | 4/2003 | Healey ............... 55/528 |

FOREIGN PATENT DOCUMENTS

| | | |
|---|---|---|
| EP | 1 048 335 A1 | 11/2000 |
| GB | 745030 | 2/1956 |
| GB | 969327 | 8/1960 |
| JP | 05195322 A2 | 8/1993 |
| JP | 05239778 A2 | 9/1993 |
| JP | 06057530 A2 | 3/1994 |
| JP | 06057531 A2 | 3/1994 |
| JP | 06264301 A2 | 9/1994 |
| WO | WO 94 18364 | 8/1994 |
| WO | WO 9916532 | 4/1999 |
| WO | WO 00 01737 | 1/2000 |

OTHER PUBLICATIONS

Angelo, R et al , "Preparation and Characterization of Selectively Isotopically Labeled Nylon 66 Polymers", *Macromolecules*, vol. 22, pp. 117-121 (1989).

Basutkar, P. et al, "Synthesis and Characterization of Phenylated Aromatic Poly(amide-amdesis", *Jour of Applied Polymer Science*, vol. 68, pp 1523-1530 (1998).

Baumgarten, P., "Electrostatic Spinning of Acrylic Microfibers", *Jour of Colloid and Interface Science* vol. 36, No. 1, 9 pages (May 1971).

Benavente, J. et al., "Electrical Properties of Modified Aromatic Polyamide Membranes", *Separation Science and Technology*, vol. 32, No. 13, pp. 2189-2199 (1997).

Bognitzki, M. et al., "Polymer, Metal and Hybrid Nano- and Mesotubes by Coating of Degradable Polymer Template Fibers (Turf-process)", Philipps-University Marburg, Department of Chemistry, Mainz Germany, pp. 45 and 46, (Date Unknown).

Bognitzki, M. et al., "Submicrometer Shaped Polyactide Fibers by Electrospinning", Philipps-University Marburg, Department of Chemistry, Mainz, Germany, pp. 115 and 116, (Date Unkown), Chun, I. et al., "Carbon Nanofibers from Polyacrylonitrile and Mesophase Pitch",*Jour. of Advanced Materials*, vol. 31, No. 1, pp. 36-41 (Jan. 1999).

Deitzel, J. et al., "Generation of Polymer Nanofibers Through Electrospinning", *Army Research Labm Aberdeen Proving Ground*, MD 21005-5006, ARL-TR-1898, pp. 1-36 (Jun. 1999).

Dhawan, S. et al., Conducting Fabrics as a Shield Against Electromagnetic Interference (EMI), *Jour. of Coated Fabrics*, vol. 28, pp. 29-36 (Jul. 1998).

Donaldson® Brochure, Ultra-Web® "Premium Quality-High Efficiency Filters", 4 pages (1994).

Donaldson Brochure, Donaldson® Gas Turbine Systems, DZ2000™ Panel Filters with Spider-Web® Filter Media, 4 pages (1997).

Donaldson Brochure, Eon™ Fine Fiber Technology by Donaldson, 6 pages (1999).

Donaldson® Brochure, Tech Topics. "Do Spider-Web Replacement Filters Really 'Cost' Extra? Analysis from High Performance Far Outweigh a Premium Price", 2 pages (Jul. 1999).

Donaldson® Brochure, Filtration Solutions for Gas Turbines, Generators, and Compressors, "DZ2000 Air Filter Media. The Longer Life, High Value Filter Media for Gas Turbine Inlet Air Filter Systems", 4 pages (Dec. 2000).

Doshi, J., "The Electrospinning Process and Applications of Electrospun Fibers", *UMI Dissertation Services* University of Akron, pp. 1-170, including sections (Aug. 1994).

Fang, X., "Application of Electrospinning for Polyers", *UMI Dissertation Services*, University of Akron, pp. 1168, including sections (Aug. 1997).

Gibson, P. et al., "Electrospinning Technology Direct Application of Tailorable Ultrathin Membranes", *Jour. of Coated Fabrics*, vol. 28, pp. 63-72 (Jul. 1998).

Giessmann, A. et al. "Multipurpose Production Line for the Coated Textile Industry", *Jour of Coated Fabrics*, vol. 28, pp. 56-62 (Jul. 1998).

Huang, M. et al., "The Modification of Nylon 6 by a Phenol-Formaldehyde Resin", *Jour. of Applied Polymer Science*, vol. 48. pp. 563-572 (1993).

Huang, T. "Modification of Nylon 6 by Phenol-Containing Polymers" *Jour. of Applied Polymer Science*, vol. 73. pp. 295-300 (1999).

Huang, R et al., "Crosslinked Blended Poly(vinyl alcohol)N-Methylol Nylon-6 Membraness for the Pervaporation Separation of Ethanol-Water Mixtures", *Jour of Applied Polymer Science*, vol. 70, pp. 317-327 (1998).

Kim, J et al. "Polybenzimidazole Nanofiber Produced by Electrospinning", *Polymer Engineering And Science*vol. 39, No. 5, pp. 849-854 (May 1999).

Kirichenko, V et al. "Acceleration of a Free Jet of Low-conducting Liquid in an Electric Field". *Sov Phys. Dokl.* vol. 35, No. 12, pp. 1018-1020 (Dec. 1990).

Kirichenko, V et al., "Charge Transfer due to the Electrohydrodynanic Atomization of a Liquid", *Sov Phys Dokl* , vol. 33, No. 8, pp. 564-566 (Aug. 1988).

Kirchenko, V. et al, "Domains of Existence of Free, Stationary Liquid Jets in a Strong External Electric Field", *Sov. Phys Dokl*, vol. 32, No. 7, pp. 544-547 (Jul. 1987).

Kirichenko, V. et al., "Gas Flow and Filtration Through Permeable Channel Walls", *Phys. Dokl.*, vol. 38, No. 4, pp. 139-141 (Apr. 1993).

Kirichenko, V. et al., "Shape of a Free, Stationary Liquid Jet in a Strong Uniform Electric Field", *Sov. Phys. Dokl*, vol. 32. No. 7, pp. 546-547 (Jul. 1987).

Kirichenko, V. et al., "Specific Charge of the Liquid in Electrohydrodynamic Atomization and Microfilament Forming Processes", *Sov. Phys. Dokl*, vol. 35, No. 12, pp. 1015-1020 (Dec. 1990).

Kirichenko, V. et al., "Transverse Splitting of a Liquid Jet in a Strong Electric Field", *Sov. Phys. Dokl.*, vol. 33, No. 9, pp. 653-654 (Sep. 1988).

Mahajan, S. et al., "Fibrillation Behavior of Oriented Tapes of Polyethylene and Its Blends. IV", *Jour. of Applied Polymer Science*, vol. 60, pp. 1551-1560 (1996).

Marijnissen. J., "Electrosprays with Applications in Aerosol Technology and Material Synthesis", 1994 International Aerosol Conference Tutorial Sessions. Los Angeles, California, pp. 1-67 (Aug. 29, 1994).

Maslowski, E et al., "New Processes for Fiber-Like PE Structures", *Fiber World*, pp. 12-14 (Mar. 1987).

National Textile Center, "Electrostatic Spining and Properties of Ultrafine Fibers", http:www.ntcresarch.org currently year8 M98-DOI.htm, last updated May 19, 1999, pp. 1-4.

Ohzawa. Y. et al., "Studies on Dry Spinning. I. Fundamental Equations", *Jour. of Applied Polymer Science*vol. 13, pp. 257-283 (1969).

Ohzawa, Y. et al., "Studies on Dry Spinning II. Numerical Solutions for Some Polymer-Solvent Systems Based on the Assumption that Drying is Controlled by Boundary-Layer Mass Transfer" *Jour. of Applied Polymer Science*, vol. 14, pp. 1879-1899 (1970).

Petryannov. I. et al., "Adhesion of Finely Dispersed Particles to the Surface of Coating Materials", *Translated from Doklady Akademii Nauk SSSR*. vol. 288, No. 5, pp. 515-551, Original Article submitted Jul. 3, 1985.

SBCCOM-Natick Public Affairs, "Army Teams with Universities to Develop Electrospun Membranes and Fabrics for Soldier Protection", http: www.Natick army_mil_pao_1998_98-26.htm.last upadated 0 27 00, pp. 1-2.

Shambaugh, R., "A Macroscopic View of the Melt-Blowing Process for Producing Microfibers", *Ind. Eng. Chem. Res.*, vol. 27, No. 12, pp. 2363-2372 (1988).

Shepelev, A. et al., "Polymeric Fiber Materials for Fine Cleaning of Gases", *J. Aerosol Sci. Suppl. 1.* vol. 26, pp. 5919-5920.

Shieh, J et al., "Preparation of N-Methylol Nylon-6 Membranes for Pervaporation of Ethanol-Water Mixtures" *Department of Chemical Engineering University of Waterloo, Ontario N2L 3GI. Canada*, pp. 855-863 (Received Jun. 24, 1996).

Sioen, J , "The Coating Company of the Future", *Jour of Coated Fabrics*, vol. 28, pp. 73-79 Jul. 1988.

Smith. J . "Cellulose Acetate Fibrets a Fibrillated Pulp with High Surface Area", *Tappi Journal*, pp. 185-193 (Dec. 1988).

Smith, R. et al, "Phase Behavior and Reaction of Nylon 6 6 in Water at High Temperatures and Pressures" *Journal of Applied Polymer Science*, vol. 76, pp. 1062-1073 (2000).

"Survey of Soluble Polyamide Patents", RT-2488R, pp. 1-6 (Oct. 14, 1954).

Taylor, G , Viscosity And Molecular Weight of Nylon, "The Relation of the Viscosity of Nylon Solutions in Formic Acid to Molecular Weight as Determined by End-Group Measurements", *Contribution From The Chemical Department, Experimental Station, E.I Du Pont De Nemours & Company*, pp. 635-637 (Mar. 1947).

Wadsworth I. et al., "Development of Highly Breathable and Effective Blood Viral Barrier Laminates of Microporous Films, Staple Fibers and Nonwovens", *Jour. of Coated Fabrics*, vol. 28, pp. 12-28 (Jul. 1998).

Wang, F. et al. "Hydrogen Bonding in Polyamide Toughened Novolac Type Phenotlic Resin", *Jour. of Applied Polymer Science*, vol. 74, pp. 2283-2289 (1999).

Wang, H. et al., "Synthesis and Properties of Nylon 6 Modified with Various Aromatic Polyamides" *Jour. of Applied Polymer Science*, vol. 68, pp. 1031-1043 (1998).

Wente, V., "Superfine Thermoplastic Fibers", *Industrial And Bio __ Chemistry*, Naval Research Laboratory, Washington 25. D.C., vol. 48, No. 8, pp. 1342-1346 (Aug. 1986).

Declaration of Doug Crofoot with Exhibits A and B, dated Sep. 10, 2001.

* cited by examiner

MIST FILTRATION ARRANGEMENT UTILIZING FINE FIBER LAYER IN CONTACT WITH MEDIA HAVING A PLEATED CONSTRUCTION AND FLOOR FILTER METHOD

RELATED APPLICATION

This application claims priority under 35 U.S.C. §119(e) to U.S. provisional application serial number 60/230,138, filed on Sep. 5, 2000, incorporated by reference herein, and is a continuation-in-part of U.S. Ser. Nos. 09/871,583 and 09/871,156, each filed on 31 May 2001.

FIELD OF THE INVENTION

The invention relates to a filter arrangement and filtration method. More specifically, it concerns an arrangement for filtering substantially liquid particulate material from a gaseous stream, for example, an air stream or a gaseous stream derived from air. The invention also concerns a method for achieving the desirable removal of liquid particulate, including aqueous, oily or emulsion lubricant particulate material from such a stream. Such lubricants can comprise non-aqueous lubricants, oily compositions, substantially aqueous lubricants or emulsions comprising a aqueous phase and a non-aqueous phase in the form of a water-in-oil emulsion or an oil-in-water emulsion.

The present invention is an on-going development of Donaldson Company Inc., of Minneapolis, Minn., the assignee of the present invention. The disclosure concerns continuing technology development related, in part, to the subjects characterized in Tokar et al., U.S. Pat. Nos. 5,415,676, 5,454,858 and 5,935,204; Osendorf, U.S. Pat. No. 5,427,597; and Johnson, U.S. Pat. No. 6,007,608, the complete disclosure of which is incorporated herein by reference.

BACKGROUND OF THE INVENTION

Gaseous streams often carry particulate material derived from the environment or from some physical operation. Commonly oil mists can be formed from synthetic petroleum or natural oils. In many instances, removal of some or all of the particulate material from a volume of gas or from gas flow stream, (i.e.) the atmosphere in a work locus, is important for aesthetic or operational purposes. In the case that a lubricant mist is entrained in the air, such mist removal can be essential for worker safety or operating efficiency. For example, in an environment wherein a thermal process involves liquid processing or a mechanical or machine operation uses a stream or film of liquid lubricant, the energy of these operations can, as a byproduct, produce an airborne mist of the lubricant liquid. Such airborne mists can be an irritation or harmful to human operators or any personnel coming into contact with important amounts of the mist. Such mists can also impact efficiency of or harm equipment.

In the past, filter structures have been used with fan driven air streams in housings and ductwork to attempt to remove such mists from the environment. We have found, however, that many installed mist collection systems are not as effective as needed in many environments. Many and return a substantial proportion of the mist to the atmosphere. Other more efficient systems, that trap and remove a substantial proportion of the mist, can become quickly saturated and rendered ineffective after a brief period of effective mist removal. This is particularly true in the case of an effective installation system utilizing a HEPA filter in a final stage. If the filtering stages preceding the final HEPA filter are not sufficiently efficient, the final HEPA filter stage can become rapidly saturated, requiring uneconomical, rapid replacement.

Accordingly, a substantial need exists for an efficient filter medium and a filter structure containing the media that can provide improved properties for filtering gaseous streams carrying a mist. The improved systems will remove substantially all mist and have an extended life. The pupil mist will have a particle size about 0.1 to 3 microns, often 0.2 to 0.8 and commonly 0.3 to 0.5 microns. Such a media and the filter structure containing the media can be used in a staged mist collection system having an initial barrier and a pre-filter prior to the filter of the invention. A high efficiency (HEPA) filter can follow the filter of the invention. In such a system, an initial stage can remove large liquid or solid particulate, a subsequent stage can collect substantially all of the mist components (at least 75%, preferably 88% or more) and a final stage utilizing a HEPA filter can polish the gaseous stream removing a substantially all traces of the mist components. Such systems should maintain an effective life, useful lifetime or effectiveness for more than two weeks, preferably more than a month.

SUMMARY OF THE INVENTION

A general technique for the design and application of filter technology for mist removal from a flow of a gaseous stream is provided. The techniques include a filter housing or structure. Enclosed within the structure is a staged filtration system. A first rough filter removes large particles. The system comprises a filter comprising a filter media having a preferred fine fiber layer in an intermediate stage that precedes the HEPA element final stage. The invention includes a preferred filter element design using the media and fine fiber, as well as the preferred methods of filtering.

The invention relates to a filter structure made by forming a substrate layer having two layers of fine fiber on opposite sides of the planer substrate. The invention can include one or more intermediate stages and also include pre-HEPA filter media stages including one or more layer of fine fiber in the form of a micro- or nanofiber web layer in intimate contact with a preferred substrate material. The fine fiber acts to initiate mist collection. The mist can coalesce into larger droplets that can be passed through the fine fiber into the substrate material or media. The substrate material then accumulates liquid until gravity overcomes the forces holding the liquid in the media. The liquid drains under gravity because the media is configured for drainage of the accumulated liquid. The fine fiber is formed on a substrate material media in a mechanically stable layered structure with the fine fibers in intimate contact with the media layer. The substrate material and the fine fiber material are selected such that the mist, first impacts on the fine fiber layer and passes into the media layer, the liquefied mist passes from the fine fiber, associates preferably with the substrate material, is accumulated in the substrate material and then, under the influence of gravity, drains from the substrate. The collected mist liquid is removed from the filter structure. These layers together provide excellent and efficient mist particulate filtering, high mist particulate capture, efficiency at minimum flow restriction when gaseous mist passes through the filter media. This improved media can protect the HEPA filter from early or quick saturation since it can remove substantial mist from the gaseous stream.

The invention relates to filter elements in filtering structures and to improved fine fiber filter technology. The invention also relates to polymeric compositions with improved properties that can be used to form fine fibers, microfibers, nanofibers, fiber webs, fibrous mats and permeable structures. The polymeric materials of the invention are compositions that have physical properties that permit the polymeric material, in a filter structure in a variety of physical shapes or forms, to have long filtering life with resistance to the degradative effects of humidity, heat, air flow, chemicals and mechanical stress or impact in filtration structures and methods.

In making non-woven fine fiber filter media, a variety of polymeric materials have been used. A variety of techniques have been used for the manufacture of small diameter micro- and nanofibers. One method involves passing the material through a fine capillary or opening either as a melted material or in a solution that is subsequently evaporated. Fibers can also be formed by using "spinnerets" typical for the manufacture of synthetic fiber such as nylon. Electrostatic spinning is also known. Such techniques involve the use of a fiber generating structure such as a hypodermic needle, nozzle, capillary or movable emitter. These structures provide liquid solutions of the polymer that are then attracted to a collection zone by a high voltage electrostatic field. As the materials are pulled from the emitter and accelerate through the electrostatic zone, the fiber becomes very thin and can be formed in a fiber structure by solvent evaporation.

The fine fiber layer and the substrate or media layer cooperate to catch, coalesce and drain mist in such a substantial proportion that a post HEPA filter can act as a final stage and have a lifetime of greater than one week, preferably two weeks, preferably greater than one month. The media of the invention is preferably one having an average pore size of no greater than 370 microns, permeability within the range of 180–350 ft/min., and a thickness of no greater than 0.04 inch. For the purpose of this patent, the term "intimate contact" means the fine fiber is in direct contact with the media such that a coalesced particulate with a particle size equal to or less than about 0.1μ can be absorbed from the fine fiber into the media.

BRIEF DESCRIPTION OF THE DRAWINGS

in FIG. 2 the wrap being depicted with a portion pulled away to view internal detail and with a closure partly open.

DETAILED DESCRIPTION OF THE INVENTION

Figure 1:
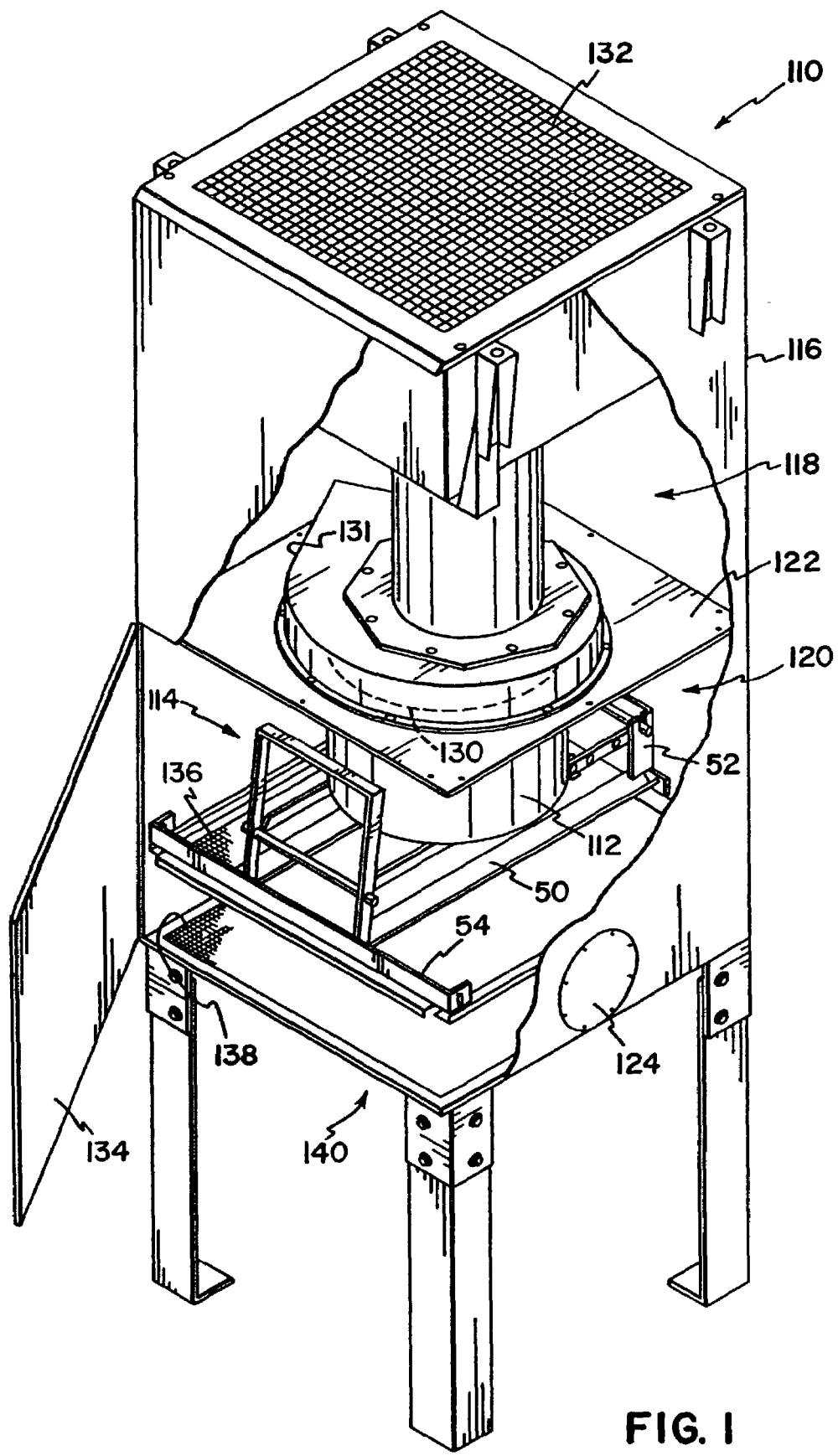
FIG. 1 illustrates a perspective view of a useful mist collection system using an air driven system that forms the mist laden air through a first rough stage, a filter media stage and a final HEPA stage.

The mist reduction system of the invention involves a multistage filtration system involving, at a minimum, a first rough filtering stage, a second fine fiber containing substrate or media stage utilizing fine fiber bonded to a porous media support followed by a high efficiency HEPA stage. This is the minimum configuration for utility in this application. Each stage can have a preceding stage or a subsequent stage of media that can cooperate with the other stages for mist reduction. In operation of the system, the mist laden gaseous stream enters the system and large particulate matter is removed from the stream in a first stage. The stream is then typically left with only mist or mist size particles entrained in the air stream. Such an air stream then contacts the fine fiber layer of the media. The mist within the stream impinges the fine fiber and mist particulate is stopped by the fine fiber layer and individual mist particles then come into contact, coalesce and form larger and larger liquid particles as additional mist particulate impinges the fine fiber layer and the growing, coalescing liquid materials on the fine fiber layer. At a certain point, the size of the growing liquid droplets are such that the liquid droplets supported on the fine fiber, come into contact with the media in intimate contact with the fine fiber and are absorbed by the media. The media then accumulates the liquid in the porous media internal structure and at a certain concentration of liquid within the porous media, under the influence of gravity, provides a passageway through the porous structure for the liquid media such that the liquid can drain from the media layer. The drained liquid can accumulate at a lower portion of the cartridge and can be removed by a variety of liquid handling techniques. The air stream now free of mist particulate passes from the cartridge and can be contacted with a high efficiency HEPA filter to remove the relatively small amounts of mist particulate remaining in the air stream. In such a system, the vast majority of mist (greater than 98%, preferably greater than 99%, most preferably greater than 99.9%) is removed in the fine fiber media layer leaving the HEPA filter to simply polish the air stream before it is returned to the working environment. Such systems are often utilized in a filter cabinet or enclosure through which the mist laden air stream is driven by mechanical air driven systems pushing the air stream through the filter stages, returning the air stream to the working environment. Such systems can comprise the filter components in a variety of structures including flat panel filters, circular cartridge filters, cylindrical cartridge filters, generally cylindrical filters having oval cross sections and others. The mechanical housing or enclosing structures for the systems can be adapted to virtually any filter shape or configuration with the limitation that the structure can include a means to drive the mist laden air stream through the mist collection filter layers.

The improvement in mist removal results from combining a fine fiber layer with a specific media selected with a fairly open pore structure. The substrate or media has a permeability at least 180 fpm, typically less than 340 fpm, preferably within the range of 200–320 fpm, more preferably 240–280 fpm, typically and most preferably about 250–270 fpm. This open structure allows the coalesced mist liquid to collect within the media and, also allows the oil to drain through as the liquid reaches a certain level in the media. Were a substantially lower permeability media chosen for this location, the retained oil would tend to plug the system. If a substantially higher permeability were chosen, the oil mist would tend to pass through into the next layer, with eventual saturation of the last HEPA stage. The preferred media in this region will have a relatively low average pore size, typically less than 400 microns, usually within the range of 180–320 microns which facilitates mist coalescence without excessive pressure build-up.

The preferred media combination with the fine fiber typically has a fairly low efficiency and low pressure drop when clean, but obtains relatively high efficiency when containing substantial liquid, i.e. loaded such that a pressure differential ($\Delta P$) across the total filter in use is at about 1–4.5 inches $H_2O$ pressure or pressure drop (typically about 4 inches of $H_2O$ or lower). The filter can maintain performance under conditions of relatively heavy mist load, i.e. 75 mg/$m^3$ or higher. Air velocity through the media wrap (typically 100–120 fpm face velocity in normal commercial systems) pushes the collected oil to the backside of the this layer where it will drain into the downstream layer next to it (layer 4 above). This coalesced oil will then drain down the outside of the cartridge before it reaches the pleated media section.

The fine fibers that comprise the micro- or nanofiber containing layer of the invention can be fiber and can have a diameter of about 0.001 to 2 micron, preferably 0.05 to 0.5 micron. The thickness of the typical fine fiber filtration layer ranges from about 1 to 100 times the fiber diameter with a basis weight ranging from about 0.01 to 240 micrograms-$cm^{-2}$. Polymer materials that can be used in the polymeric compositions of the invention include both addition polymer and condensation polymer materials such as polyolefin, polyacetal, polyamide, polyester, cellulose ether and ester, polyalkylene sulfide, polyarylene oxide, polysulfone, modified polysulfone polymers and mixtures thereof. Preferred materials that fall within these generic classes include polyethylene, polypropylene, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a Tg greater than room temperature). This is the case for polyvinylchloride and polymethylmethacrylate, polystyrene polymer compositions or alloys or low in crystallinity for polyvinylidene fluoride and polyvinylalcohol materials. One class of polyamide condensation polymers are nylon materials. The term "nylon" is a generic name for all long chain synthetic polyamides. Typically, nylon nomenclature includes a series of numbers such as in nylon-6,6 which indicates that the starting materials are a $C_6$ diamine and a $C_6$ diacid (the first digit indicating a $C_6$ diamine and the second digit indicating a $C_6$ dicarboxylic acid compound). Another nylon can be made by the polycondensation of epsilon caprolactam in the presence of a small amount of water. This reaction forms a nylon-6 (made from a cyclic lactam—also known as epsilon-aminocaproic acid) that is a linear polyamide. Further, nylon copolymers are also contemplated. Copolymers can be made by combining various diamine compounds, various diacid compounds and various cyclic lactam structures in a reaction mixture and then forming the nylon with randomly positioned monomeric materials in a polyamide structure. For example, a nylon 6,6-6,10 material is a nylon manufactured from hexamethylene diamine and a $C_6$ and a $C_{10}$ blend of diacids. A nylon 6-6,6-6,10 is a nylon manufactured by copolymerization of epsilonaminocaproic acid, hexamethylene diamine and a blend of a $C_6$ and a $C_{10}$ diacid material.

Block copolymers are also useful in the process of this invention. With such copolymers the choice of solvent swelling agent is important. The selected solvent is such that both blocks were soluble in the solvent. One example is a ABA (styrene-EP-styrene) or AB (styrene-EP) polymer in methylene chloride solvent. If one component is not soluble in the solvent, it will form a gel. Examples of such block copolymers are Kraton® type of styrene-b-butadiene and styrene-b-hydrogenated butadiene(ethylene propylene), Pebax® type of e-caprolactam-b-ethylene oxide, Sympatex® polyester-b-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly(methyl methacrylate) and its various copolymers, can be solution spun with relative ease because they are soluble at low pressures and temperatures. However, highly crystalline polymer like polyethylene and polypropylene require high temperature, high pressure solvent if they are to be solution spun. Therefore, solution spinning of the polyethylene and polypropylene is very difficult. Electrostatic solution spinning is one method of making nanofibers and microfiber.

We have also found a substantial advantage to forming polymeric compositions comprising two or more polymeric materials in polymer admixture, alloy format or in a crosslinked chemically bonded structure. We believe such polymer compositions improve physical properties by changing polymer attributes such as improving polymer chain flexibility or chain mobility, increasing overall molecular weight and providing reinforcement through the formation of networks of polymeric materials.

In one embodiment of this concept, two related polymer materials can be blended for beneficial properties. For example, a high molecular weight polyvinylchloride can be blended with a low molecular weight polyvinylchloride. Similarly, a high molecular weight nylon material can be blended with a low molecular weight nylon material. Further, differing species of a general polymeric genus can be blended. For example, a high molecular weight styrene material can be blended with a low molecular weight, high impact polystyrene. A Nylon-6 material can be blended with a nylon copolymer such as a Nylon-6; 6,6; 6,10 copolymer. Further, a polyvinylalcohol having a low degree of hydrolysis such as a 87% hydrolyzed polyvinylalcohol can be blended with a fully or superhydrolyzed polyvinylalcohol having a degree of hydrolysis between 98 and 99.9% and higher. All of these materials in admixture can be crosslinked using appropriate crosslinking mechanisms. Nylons can be crosslinked using crosslinking agents that are reactive with the nitrogen atom in the amide linkage. Polyvinylalcohol materials can be crosslinked using hydroxyl reactive materials such as monoaldehydes, such as formaldehyde, ureas, melamine-formaldehyde resin and its analogues, boric acids and other inorganic compounds. dialdehydes, diacids, urethanes, epoxies and other known crosslinking agents. Crosslinking technology is a well known and understood phenomenon in which a crosslinking reagent reacts and forms covalent bonds between polymer chains to substantially improve molecular weight, chemical resistance, overall strength and resistance to mechanical degradation.

We have found that additive materials can significantly improve the properties of the polymer materials in the form of a fine fiber. The resistance to the effects of heat, humidity, impact, mechanical stress and other negative environmental effect can be substantially improved by the presence of additive materials. We have found that while processing the microfiber materials of the invention, that the additive materials can improve the oleophobic character, the hydrophobic character and can appear to aid in improving the chemical stability of the materials. We believe that the fine fibers of the invention in the form of a microfiber are improved by the presence of these oleophobic and hydrophobic additives as these additives form a protective layer coating, ablative surface or penetrate the surface to some depth to improve the nature of the polymeric material. We believe the important characteristics of these materials are the presence of a strongly hydrophobic group that can preferably also have oleophobic character. Strongly hydrophobic groups include fluorocarbon groups, hydrophobic hydrocarbon surfactants or blocks and substantially hydrocarbon oligomeric compositions. These materials are manufactured in compositions that have a portion of the molecule that tends to be compatible with the polymer material affording typically a physical bond or association with the polymer while the strongly hydrophobic or oleophobic group, as a result of the association of the additive with the polymer, forms a protective surface layer that resides on the surface or becomes alloyed with or mixed with the polymer surface layers. For 0.2-micron fiber with 10% additive level, the surface thickness is calculated to be around 50 Å, if the additive has migrated toward the surface. Migration is believed to occur due to the incompatible nature of the oleophobic or hydrophobic groups in the bulk material. A 50 Å thickness appears to be reasonable thickness for protective coating. For 0.05-micron diameter fiber, 50 Å thickness corresponds to 20% mass. For 2 microns thickness fiber, 50 Å thickness corresponds to 2% mass. Preferably the additive materials are used at an amount of about 2 to 25 wt. %. Oligomeric additives that can be used in combination with the polymer materials of the invention include oligomers having a molecular weight of about 500 to about 5000, preferably about 500 to about 3000 including fluoro-chemicals, nonionic surfactants and low molecular weight resins or oligomers.

Preferably the layer of fine fiber material secured to the first surface of the layer of permeable coarse fibrous media is a layer of nano- and microfiber media wherein the fibers have average fiber diameters of no greater than about 2 microns, generally and preferably no greater than about 1 micron, and typically and preferably have fiber diameters smaller than 0.5 micron and within the range of about 0.05 to 0.5 micron. Also, preferably the first layer of fine fiber material secured to the first surface of the first layer of permeable coarse fibrous material has an overall thickness that is no greater than about 30 microns, more preferably no more than 20 microns, most preferably no greater than about 10 microns, and typically and preferably that is within a thickness of about 1–8 times (and more preferably no more than 5 times) the fine fiber average diameter of the layer. The fine fiber layer formed on each side of the substrate or media can have a thickness of about 0.5 to 50 microns.

An important aspect of the invention is the utility of such microfiber or nanofiber materials formed into a filter structure. In such a structure, the fine fiber materials of the invention are formed on and adhered to a filter substrate. Natural fiber and synthetic fiber substrates, like spun bonded fabrics, non-woven fabrics of synthetic fiber and non-wovens made from the blends of cellulosics, synthetic and glass fibers, non-woven and woven glass fabrics, plastic screen like materials both extruded and hole punched, UF and MF membranes of organic polymers can be used. Sheet-like substrate or cellulosic non-woven web can then be formed into a filter structure that is placed in a fluid stream including an air stream or liquid stream for the purpose of removing suspended or entrained particulate from that stream. The shape and structure of the filter material is up to the design engineer. One important parameter of the filter elements after formation is its resistance to the effects of heat, humidity or both. One aspect of the filter media of the invention is a test of the ability of the filter media to survive immersion in warm water for a significant period of time. The immersion test can provide valuable information regarding the ability of the fine fiber to survive hot humid conditions and to survive the cleaning of the filter element in aqueous solutions that can contain substantial proportions of strong cleaning surfactants and strong alkalinity materials. Preferably, the fine fiber materials of the invention can survive immersion in hot water while retaining at least 50% of the fine fiber formed on the surface of the substrate. Retention of at least 50% of the fine fiber can maintain substantial fiber efficiency without loss of filtration capacity or increased back pressure. Most preferably retaining at least 75%.

A fine fiber filter structure includes a bi-layer or multi-layer structure wherein the filter contains one or more fine fiber layers combined with or separated by one or more synthetic, cellulosic or blended webs. Another preferred motif is a structure including fine fiber in a matrix or blend of other fibers.

We believe important characteristics of the fiber and microfiber layers in the filter structure relate to temperature resistance, humidity or moisture resistance and solvent resistance, particularly when the microfiber is contacted with humidity, moisture or a solvent at elevated temperatures. Further, a second important property of the materials of the invention relates to the adhesion of the material to a substrate structure. The microfiber layer adhesion is an important characteristic of the filter material such that the material can be manufactured without delaminating the microfiber layer from the substrate, the microfiber layer plus substrate can be processed into a filter structure including pleats, rolled materials and other structures without significant delamination. We have found that the heating step of the manufacturing process wherein the temperature is raised to a temperature at or near but just below melt temperature of one polymer material, typically lower than the lowest melt temperature substantially improves the adhesion of the fibers to each other and the substrate. At or above the melt temperature, the fine fiber can lose its fibrous structure. It is also critical to control heating rate. If the fiber is exposed to its crystallization temperature for extended period of time, it is also possible to lose fibrous structure. Careful heat treatment also improved polymer properties that result from the formation of the exterior additive layers as additive materials migrate to the surface and expose hydrophobic or oleophobic groups on the fiber surface. The criteria for performance is that the material be capable of surviving intact various operating temperatures. The substrate useful in the invention has a basis weight of at least 30, preferably 60 to 120 pounds per 3000 square feet (lb-3000 ft$^{-2}$) and a thickness of 0.005 to 0.08 inches, The performance of a filter unit comprising the fine fiber and media layer can be improved through the properties of a prewrap filter stage that can be wrapped in a configuration that is upstream from the fine fiber layer. In other words, the mist laden gaseous stream impacts the prefilter wrap used in conjunction with the fine fiber layer before the gaseous stream contacts the fine fiber layer. One form of the prefilter wrap useful in this invention is shown in Tokar, U.S. Pat. No. 5,454,858. The prefilter wrap is preferably constructed of layers of nonwoven, air-laid media such as high loft air-laid or dry-laid materials or combinations thereof. Such prefilter wraps typically have a higher permeability than the fine fiber media layer, typically have reduced efficiency with respect to the mist particulate in the gaseous stream but can, in a stage previous to the fine fiber media state, remove some proportion of the mist from the gaseous stream, improving the overall efficiency of the system as a whole. In mist reduction, the preferred prefilter wrap of the invention accumulates oil during operation of the overall mist collection system. As mist coalesces and oil accumulates within the prefilter wrap, the pressure drop across the filter and across the prewrap and filter increases. At a certain percentage, the oil accumulating within the prewrap can drain similar to the operation of the fine fiber media layer. This technology development includes and extends the filters and related structures characterized in Tokar et al., U.S. Pat. Nos. 5,415,676, 5,454,858 and 5,935,204; Osendorf, U.S. Pat. No. 5,427,597; and Johnson, U.S. Pat. No. 6,007,608, the complete disclosure of which is incorporated herein by reference.

Since the fine fiber media filter can be formed in a variety of configurations, the prewrap is configured into a shape that can conform to the fine fiber media filter. As such, the wrap can be configured into a layer that can surround substantially the entirety of the exterior of a cylindrical filter, can substantially cover the entirety of an intake surface of a flat panel filter. In similar configurations, the prewrap can be configured to contact substantially the entire gaseous stream prior to its contact with the fine fiber layer.

Certain preferred arrangements according to the fine filter media layer of the present invention include filter media as generally defined, in an overall filter construction. Some preferred arrangements for such use comprise the fine fiber media layer arranged in a cylindrical, pleated configuration with the pleats extending generally longitudinally, i.e. in the same direction as a longitudinal axis of the cylindrical pattern. For such arrangements, the media may be imbedded in end caps, as with conventional filters. Such arrangements may include upstream liners and downstream liners if desired, for typical conventional purposes.

In some applications, media according to the present invention may be used in conjunction with other types of media, for example conventional media, to improve overall filtering performance or lifetime. For example, media according to the present invention may be laminated to conventional media, be utilized in stack arrangements; or be incorporated (an integral feature) into media structures including one or more regions of conventional media. It may be used upstream of such media, for good load; and/or, it may be used downstream from conventional media, as a high efficiency polishing filter.

According to the present invention, methods are provided for filtering. The methods generally involve utilization of media as described to advantage, for filtering. As will be seen from the descriptions figures and examples below, media according to the present invention can be specifically configured and constructed to provide relatively long life in relatively efficient systems, to advantage.

In overall operation, a gas stream enters the mist collection system of the invention (FIG. 1). The mist collection system of the invention typically is operated by a fan that draws ambient air from the adjacent environment through an intake. The action of the fan drives the gaseous stream through the overall system and the air, depleted of mist, substantially exists an open portion of the system after filtering. Within the system, the air stream typically first contacts a rough open filtration device that commonly removes large particulates, gross objects and can act as a safety screen for operating personnel. Such a first portion of the system leaves substantially only entrained mist in the gaseous stream. The mist laden stream is then contacted with a prefilter and filter cartridge (FIGS. 2–3) in a preferred embodiment to begin to remove liquid from the air stream. This prefilter is held in contact with the fine fiber media layer. In the fine fiber media layer, the substantial proportion of mist is removed from the gaseous stream. In a preferred mode of the invention, the prefilter and the fine fiber media layer cooperate to remove substantially all mist from the gaseous stream leaving the final media layer, an HEPA filter to polish the remaining very small mist particulates from the gaseous stream. In this sequence of steps within the mist removal system of the invention, each portion of the system removes progressively smaller particle sizes. As the gaseous stream exits the fine fiber/media layer, the remaining mist comprises a relatively small proportion of the original mist and is typically very small particulates that can be easily polished by a final HEPA filter. The gaseous stream leaving the HEPA filter typically contains substantially no mist and can be returned to the working environment.

After the gross screen portion, a first portion of the pre-filter is encountered by gas flow, carrying mist to be collected therein, during filtering. As a result, it is sometimes characterized as the most upstream region. Preferably, a relatively "high loft" media is used, so that it can load significantly with larger particulate material in a pre-filtering process, without undesirable levels of plugging or occlusion. Preferably it is formed from a fibrous depth media of the type appropriate for collection of the selected liquid thereon. Preferably the media in this portion of the prefilter is a polyester media.

The preferred construction for this prefilter (see FIGS. 4–5) is a construction with a gradient through its depth. Preferably, to accomplish this, the filter comprises more than one layer of media, oriented in series with respect to air passage through the pre-filter wrap 421. Preferably the gradient is provided such that the outer most layer 456 (most upstream layer in use) is generally formed from a material which, when tested alone, has a lower efficiency for filtering (or higher permeability) than does the media the next downstream region 457 (when tested alone).

The gradient can be provided in a variety of manners including, for example, by providing for materials that have: a variation in thickness from one another, a variation in percent solidity from one another; and/or, a variation in average fiber size from one another. Typical, preferred, gradients will result from providing for variation in all three of these variables, with the outer layer having (relative to the next inner layer): higher permeability; lower percent solidity; higher average fiber diameter; and, greater thickness.

The outermost layer 456 of the prefilter can comprise nonwoven, high loft polyester fiber media having: a permeability (minimum) of 500 fpm (152 mpm) and typically about 500 to 750 fpm; a % solidity, free state of less than 1.2%, typically less than 1% and preferably about 0.5 to 0.8%; a basis weight of about 4.0–4.8 oz. per yard$^2$ (136–163 gram per meter$^2$); a free state thickness (thickness at 0.002 psi compression) of 0.55–0.70 inches (14.0–18 mm); and an average fiber size of at least 14 microns and not more than 27 microns (either mass or length average), preferably about 16–24 microns (average or length average.) Of course mass and weight average are the same if the material is not of a mixture of different sized fibers. Useable materials are readily available from such suppliers as Fiberbond Corp. of Michigan City, Ind. and Kem-Wove, Inc. of Charlotte, N.C. The material may comprise a mixture of fibers. Typical commercial products will be provided with a resin thereon in order to ensure integrity of the fiber structure. Bicomponent fiber systems could be used to provide a similar effect.

The media in region 457 is preferably one that can provide for a gradient in efficiency, or % solidity, with an increase in efficiency relative to region 456. Preferably the material is a non-woven polyester fiber filter medium having a permeability, minimum, of at least 350 fpm, typically at least 370 fpm (113 m/min.) but generally at least 50 ft/min. lower (usually at least 100 fpm lower) than the media in region 456. (Typically the permeability is about 350 to 550 fpm.) Preferably the material is one which has a free state thickness (i.e. thickness at 0.002 psi compression) within the range of 0.32–0.42 inches (8.1–10.7 mm); and a basis weight of 3.1–3.8 oz per yard$^2$ (105–129 gram per meter$^2$). Preferably the material is one having an average fiber diameter of at least 8 microns and not more than 16 microns (weight or length average), more preferably at least 10 microns and typically 10–14 microns. Preferably the material is one having a free state solidity of less than 1.2%, typically 0.5–1.0% usually about 0.7–0.9%. Materials comprising a mixture of fibers can be used.

Such materials are commercially available from such suppliers as Fiberbond Corp. of Michigan City, Ind. and Kem-Wove, Inc. of Charlotte, N.C. Commercial samples will typically be provided with a resin therein in order to maintain structural integrity. Bicomponent fibers may be used for a similar effect.

The prefilter can have additional layers preferably having on the upstream side substantially higher permeability than later stages, but having an average pore size sufficiently small to ensure coalescence therein of trapped liquid; and, is a material which has sufficient permeability and related characteristics such that it does not too rapidly occlude with rapid pressure drop increase and is such that a steady state operation can be achieved during normal operation of the mist collector (i.e. with a face velocity of 80 to 140 fpm and a pressure drop of about 4" H$_2$O or less. A preferred material would be one having: a basis weight of at least 40 lbs/3,000 ft$^2$ typically 65–82 lbs/3,000 ft$^2$ most preferably 74–78 lbs/3,000 ft$^2$. Preferably the material is one having a Frazier permeability lower than the material in any portion of Stage I, preferably at least 30 fpm lower. Preferably the material as a permeability (minimum) of 180 fpm, preferably no more than 350 fpm and is most preferably within the range of 200–320 fpm (79±18 meter/minute). The material is preferably one having a thickness of no greater than about 0.4 inch, typically about 0.01 to 0.4 inch and preferably about 0.1 to 0.35 inch. The material is preferably one having an average fiber size within the range of 16–24 microns. In general, preferred materials will have an average pore size of at least 150 microns, typically at least 200 microns, preferably not more than about 370 microns and in typical preferred applications within the range of 200–320 microns.

Materials having a dry burst strength of about 125 psi (861 kPa) and a wet burst strength of about 60–160 psi (758±345 kPa) will be preferred. Materials comprising a mixture of fibers can be used. Most preferably the material is at least 80% by wt. fiber, most preferably about 90% or more, the remainder being resin.

The prefilter can have additional downstream layers. Such layers comprise preferably a material such as the preferred material described for region 457. Similar materials from the same commercial sources can be used. Such a material is preferred for the properties that it provides for a region downstream in which liquid material previously collected can drain, yet at the same time the region is of a sufficiently low velocity and high load capability, that the steady state operation preferred can be relatively rapidly achieved and will be long lasting. That is, the liquid collected in such a material will generally drain at a rate such as to provide for steady state operation without surpassing the preferred ΔP, for example 4 inches of H$_2$O.

It has been found that when the pre-filter wrap 421 is as described in this section as preferred, useful layers, the pre-filter wrap is particularly good for use with 100% oil collection systems. However, it is noted that such wraps will also be effective even when the liquid to be collected is not 100% oil, for example when it is an aqueous based (80–290% water) cutting fluid.

Figure 4:
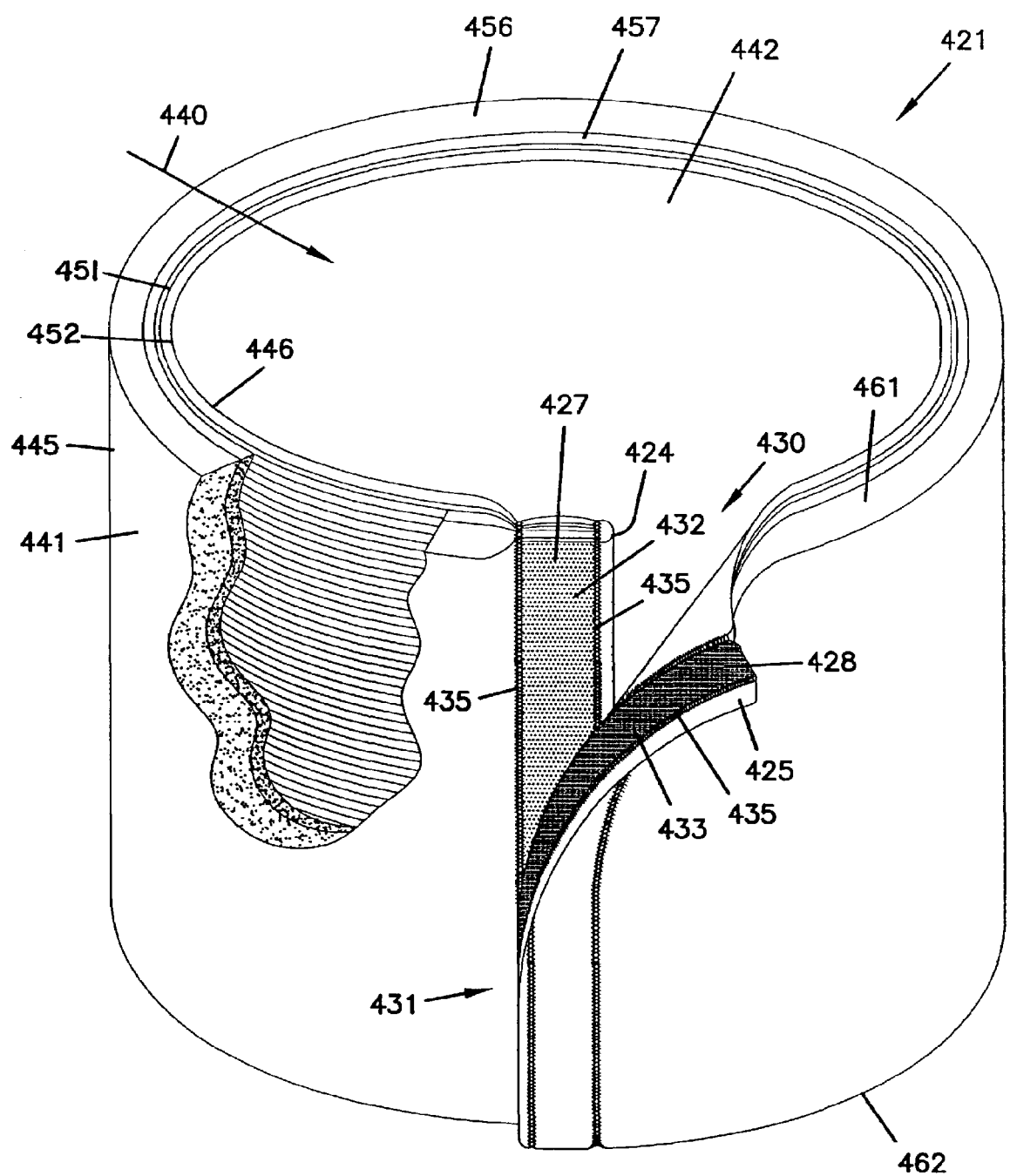
FIG. 4 is a schematic, perspective view of a pre-filter wrap according to the present invention.
Figure 5:
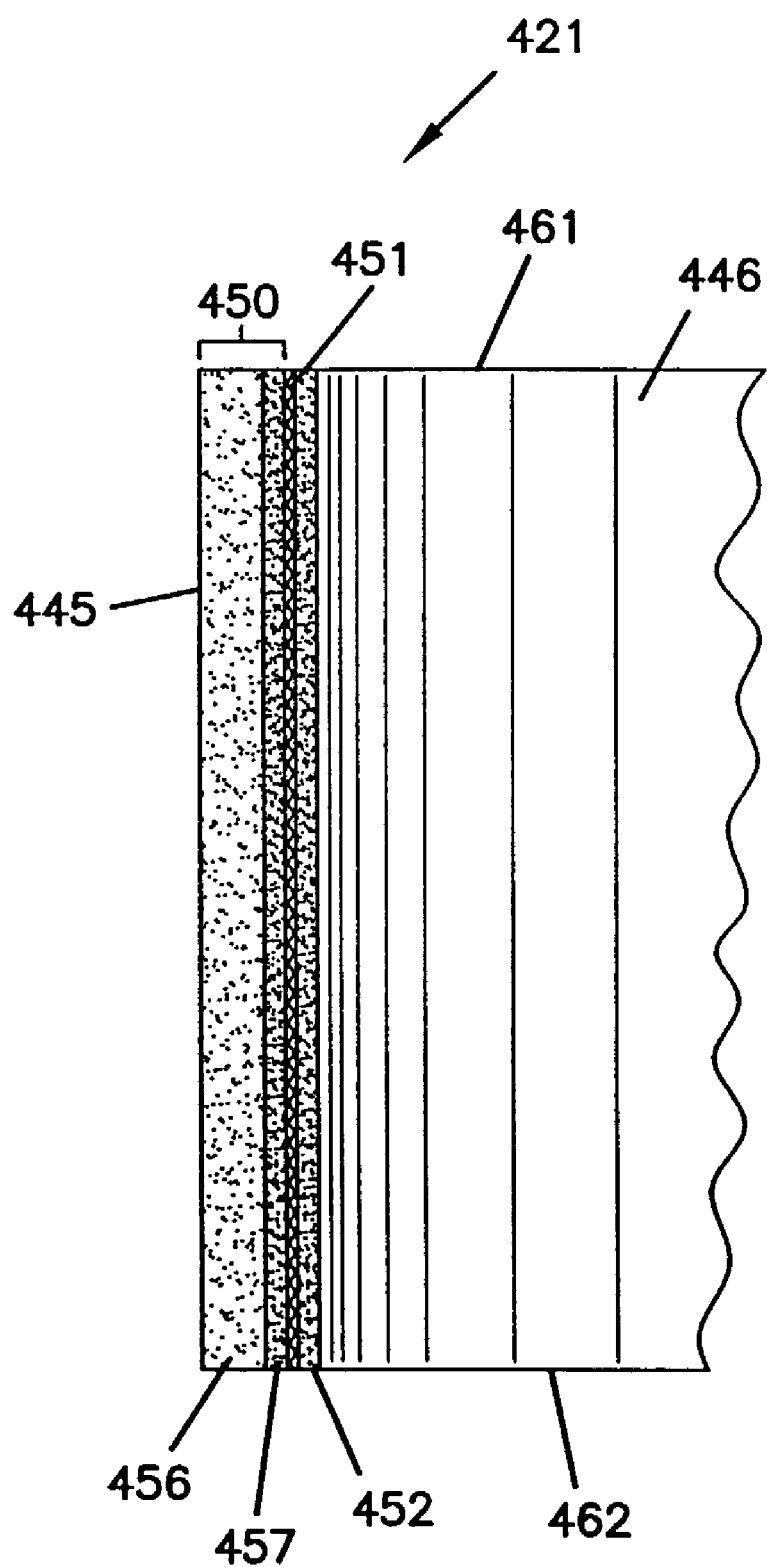
FIG. 5 is a fragmentary cross-sectional view of the wrap of FIG. 4.

FIGS. 4 and 5 show the various layers of media are only sewn (stitched) to one another in the region of ends 424–425, and the layers are specifically not sewn to one another along the top and bottom edges 461 and 462 respectively. This helps allow for passage of the coalesced liquid through the various layers with drainage down toward the bottom, in use. Also, as a result of not being sewn along either edge 461 or 462, the wrap 421 is vertically reversible.

FIG. 1 illustrates a mist collection system 110 for use with the preferred mist collector cartridge 12 having the fine fiber media layer. The improved preferred filter wrap 421 can be used with any suitable filtration system and cartridge and its application is not limited to the illustrated mist collection system 110 and cartridge 112 depicted.

The mist collection system 110 comprises a housing 316 with an upper chamber 318 and lower chamber 320 separated by a dividing wall 122 having an exhaust port opening 130. The upper chamber 318 contains a blower housing 126 and a motor 128 in fluid communication with the mist collector cartridge 112 by way of the exhaust port 130.

A fan in the blower housing 126 draws mist laden air into the lower chamber 320 through an air inlet port 124. The contaminated air is drawn through the sidewalls of the mist collector cartridge 112 and is expelled through a blower opening 131 into the upper chamber 128. As pressure in the upper chamber 318 increases, the filtered air is forced through a screened outlet port 132 in the top of the mist collection system 110. A high efficiency particulate air (HEPA) filter may be installed upstream but proximate the outlet port 132 in the upper chamber 318 as a final stage filter to polish the air stream of small particulate mist.

A door 134 is provided on the front of the lower chamber 320 through which the mist collector cartridge 112 can be inserted or removed. An upper screen 136 and lower screen 138 are preferably located in the lower chamber 320 of the mist collection system 110 above and below the air inlet port 124, respectively. The upper and lower screens 136, 138 prevent particulates, such as metal shavings, from being drawn into the mist collection cartridge 112 or from falling into a hopper 140 at the bottom of the mist collection system 110. The figures illustrate screen members 136 and 138 but any structure that can provide minimal restriction to air flow, with an inertial barrier to entrained materials, can be used in this manner. Useful inertial barriers include louveres and louvered panels, foam barriers, high loft panels, "furnace" filter structures and high permeability nonwoven fabrics.

Figure 2:
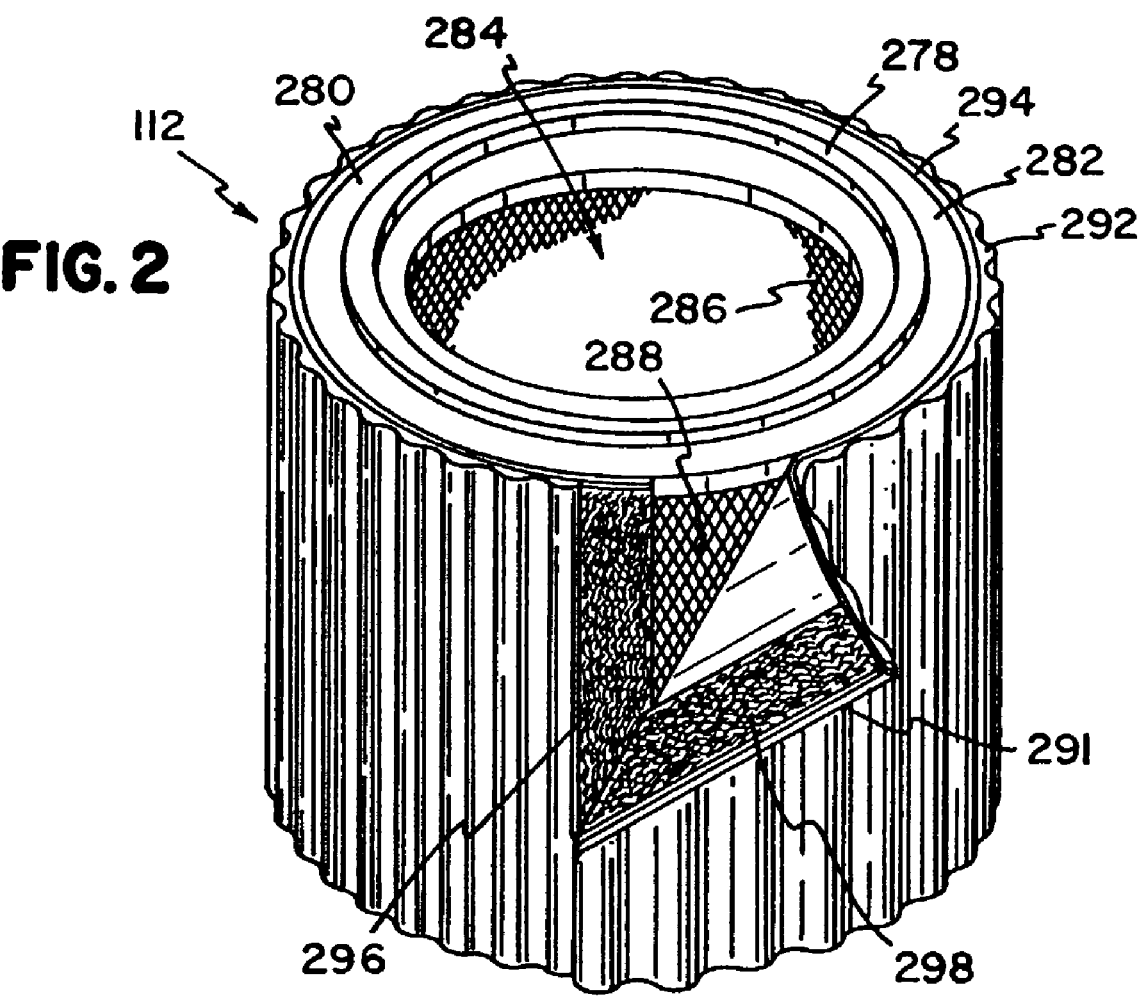
FIG. 2 is a perspective view of the mist collector cartridge with a multiple stage construction using a first pre-filter wrap over a second fine fiber containing media layer.
Figure 3:
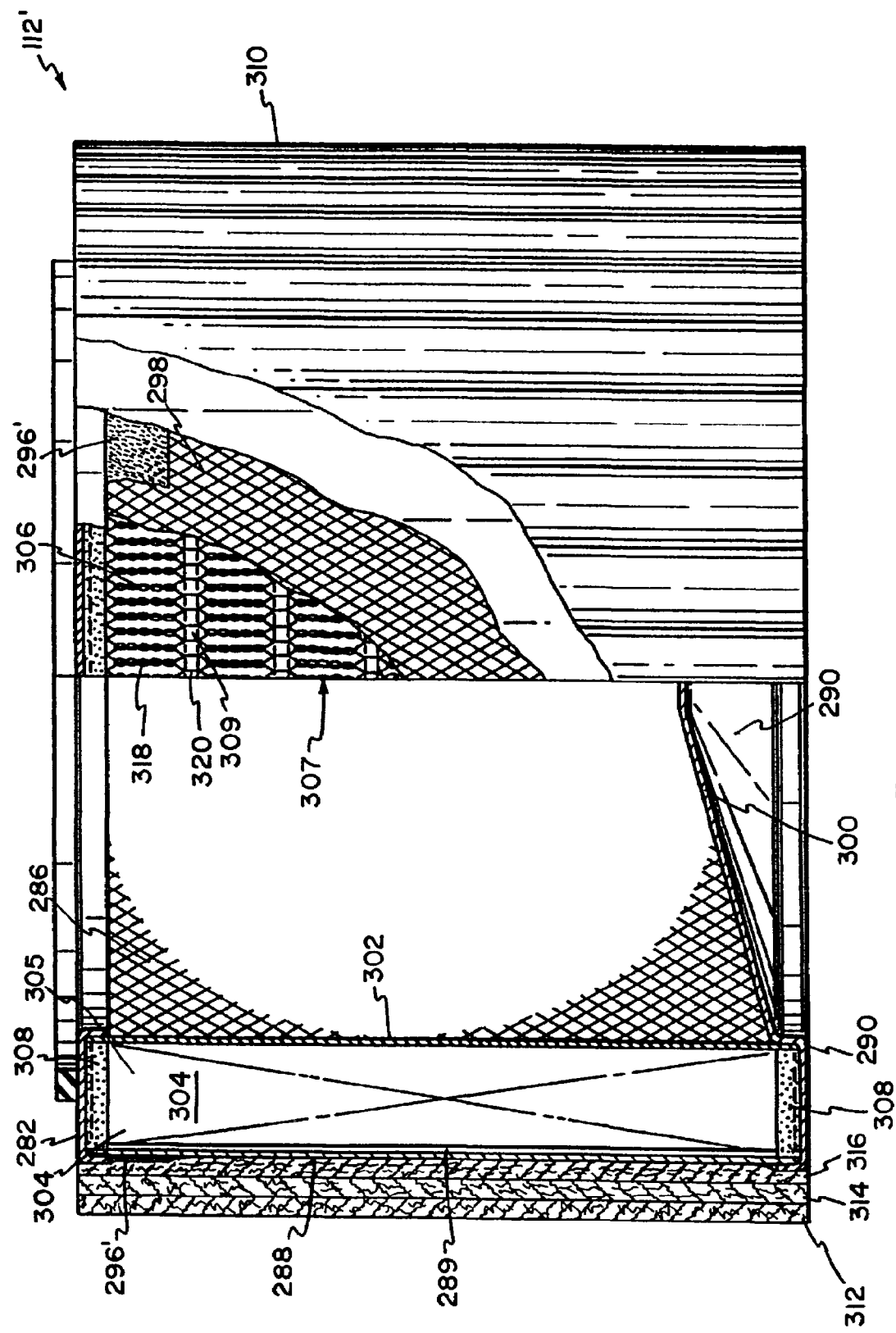
FIG. 3 is a sectional view of a mist collector cartridge using multiple layers of a non-woven media having a fine fiber layer as a pre-filter wrap.

The mist collector cartridge 112 is retained in the lower chamber 320 of the mist collection system 110 by the filter retention mechanism 14. The preferred filter cartridge retention system 114 depicted contains a pair of V-shaped angled slides 150 which extend from a rear pivot bracket 52 mounted on the rear of the mist collection system 110 to a front bracket 154 attached to the mist collection system 110 proximate the door 134. FIG. 2 illustrates a mist collector cartridge 12. Filter support members 280 preferably include a circular top member or top end cap 282 having a top opening 284, perforated inner and outer filter sidewalls or liners 286, 288 and a conical bottom end cap 290 (See FIG. 3). The top end cap 282 contains a compression gasket 278 to ensure fluid tight engagement with the exhaust port 130. The support members 280 could be constructed of any suitable material, including metal or plastic. FIG. 3 illustrates a sectional view of another mist collector cartridge 12' of U.S. Pat. No. 5,454,858. The bottom end cap 290 has a sloped portion 300 which allows oil that is collected on the inner surface 302 of cartridge 12' to drain through filter media 304 and into the hopper 140.

The filter media 304 shown here in cross-section contains a layer of fine fiber 305 substantially covering the entire upstream surface of the media layer 304. Such media are prepared by first passing a sheet-like layer of the media, commonly from a roll source through a station involving the electrostatic spinning of the fiber from a source to the layer under the influence of a substantial electrical potential. The electrical potential separates the fine fiber liquid into multiple thin fiber and randomly distributes the fine fibers onto the media layer. After the fine fiber layer is fully formed, covering the media 304, the media can then be passed to a station wherein the media is pleated, dimpled and then directed to a station wherein it is installed into a cartridge structure between perforate inner and outer liners as shown. A preferred media 304 can comprise a cellulosic media, a polyester media, a cellulosic-polyester media or more preferably a synthetic glass and polyester material arranged to form a cylindrical pleated filter cartridge. (A pleated construction being one which, in cross-section, has a plurality of alternating peaks and valleys.) The filter media 304 was described as preferably having a high efficiency, between 70 and 90 percent at 0.778 micron particles.

To keep pleats 307 correctly spaced, the filter media 304 and fine fiber 305 was described as scored to create alternating rectilinear line portions 318 and curvilinear line portions 320. During the corrugation process, dimples 309 were described as integrally formed in the filter media 304 along the pleat tips 306 to maintain the spacing between the pleats 307. Construction of a corrugated filter media of this type was disclosed in U.S. Pat. No. 4,452,619, issued to Wright et al. on Jun. 5, 1984, which is hereby incorporated by reference into this specification.

According to Wright, the '858 patent, as dirt and oil accumulate on the filter media 304, the media 304 becomes partially clogged so that the air flowing through the filter media 304 accelerates to create additional pressure on the filter media 304. In order for the filter media 304 to withstand the increased pressure, the pleats 307 were described as preferably spaced more closely together than on an air filter, giving the filter media 304 additional structural integrity. According to the '858 patent, because pleats on an ordinary air filter are generally spaced further apart, they would probably collapse under the air pressure in the present mist collection system.

The filter media 304 was described as preferably a low surface energy synthetic fiber matrix constructed from fibers having a thickness of less than 0.030 inch. The filter media 304 may be treated (in part or in total) with a low surface energy material, such as an aliphatic fluorocarbon. One low energy coating suitable for this purpose is sold under the trade name Scotchguard® or Scotchban® Protector, by 3M Corporation, St. Paul, Minn. Scotchban® Protector is described in brochure entitled *Introducing FX-845 Scotchban Chemistry Takes On A New Life*, dated 1991, which is hereby incorporated by reference into this specification. Low surface energy coatings and low surface energy materials create a low surface energy on the filter media 304 which facilitates agglomeration of the oil and promotes drainage. The pre-filter wraps 291, 310 may also be treated (in part or in whole) with a low surface energy material.

As is illustrated in FIG. 3, the filter media 304 of U.S. Pat. No. 5,454,858 was recessed or set back from the inside surface of the outer liner 288 so that a space 89 was formed between the outer liner 288 and the filter media 304. The space 89 allows much of the oil that penetrates the pre-filter wrap 291 to form droplets on the inside surface of the pre-filter wrap 292 or the outer liner 288, rather than on the filter media 304.

According to U.S. Pat. No.5,454,858, the pleats 306 are arranged vertically in the cartridges 12, 12'. The filter media 304, and inner and outer liners 286, 288 are retained in the top and bottom end caps 282, 290 by a filter media adhesive 308, such as plastisol. The hook portion 296' of a fastener material may be retained between the outer liner 288 and the top end cap 282 around the perimeter of the mist collector cartridge 12' by the adhesive 308. The pre-filter wrap 291 may then be attached directly to the mist collector cartridge 12, 12' using the attachment formed using the hook portion and the fastener portion 298 of attachment means such as a Velcro or snap-fit attachment.

Oil mist too fine to collect on the outside surface of the filter media 304 may emerge on the inner surface 302 of the pleats 306. The vertical pleats 306 allow liquid collected on the inner surface 302 to drain downward onto the bottom end cap 290 of the cartridges 12, 12', where it passes through the filter media 304 and into the hopper 140.

In FIGS. 4 and 5 there is depicted a pre-filter wrap 421 according to the present invention. This pre-filter wrap 421 would, advantageously, be useable as a pre-filter wrap in place of pre-filter wrap 312 in cartridge system 12', FIG. 3; or in place of pre-filter wrap 291 in collector cartridge system 12, FIG. 2. The preferred internal cartridge around which wrap 421 can be used, will be of the type-described generally above with respect to FIGS. 1–3. From the description of materials hereinbelow, it will be apparent that the pre-filter wrap 421 can be configured in a variety of shapes and sizes, to fit around the outside of a variety of internal cartridges.

The pre-filter wrap 421 is depicted in FIG. 4 and is shown in a configuration which it would possess during a step of mounting around a remainder of a circular, cylindrical, cartridge, (not shown). The pre-filter wrap 421 is shown in FIG. 4, therefore, in a circular configuration. The pre-filter wrap 421 depicted is rectangular (when unfolded) and includes first and second ends 424 and 425. When mounted around a remainder of the cartridge, the ends 424 and 425 would typically be overlapped, as partially shown in FIG. 4. In the regions 427 and 428 of overlap, the pre-filter wrap 421 is provided with an engagement mechanism 430. The preferred engagement mechanism 430 is a hook and loop closure mechanism 431 such as that available under the trade designation VELCRO®. The hook and loop closure mechanism 431 comprises two strips of hook and loop closure material 432, 433, one each of which is secured by stitching 435 in regions 427 and 428 respectively. As will be described below, the pre-filter wrap 421 comprises a plurality of layers of material and stitching in regions 435 preferably extends through all media layers, securing them together in these regions.

In general, the arrangement of FIG. 4 is a "forward flow" pre-filter wrap. That is, pre-filter wrap 421 is shown as it would be constructed and arranged to wrap around the cartridge used for "forward flow" collection of mist aerosol, i.e. with a flow of air, carrying the mist therein, through the pre-filter. This is a flow in the direction from an exterior 441, to an interior region 442 through wrap 421. Of course in typical use, the remainder of filter cartridge would be positioned with an interior region 441, as depicted in FIGS. 2 and 3 and the flow would also be in a "forward" direction through the cartridge.

Figure 8:
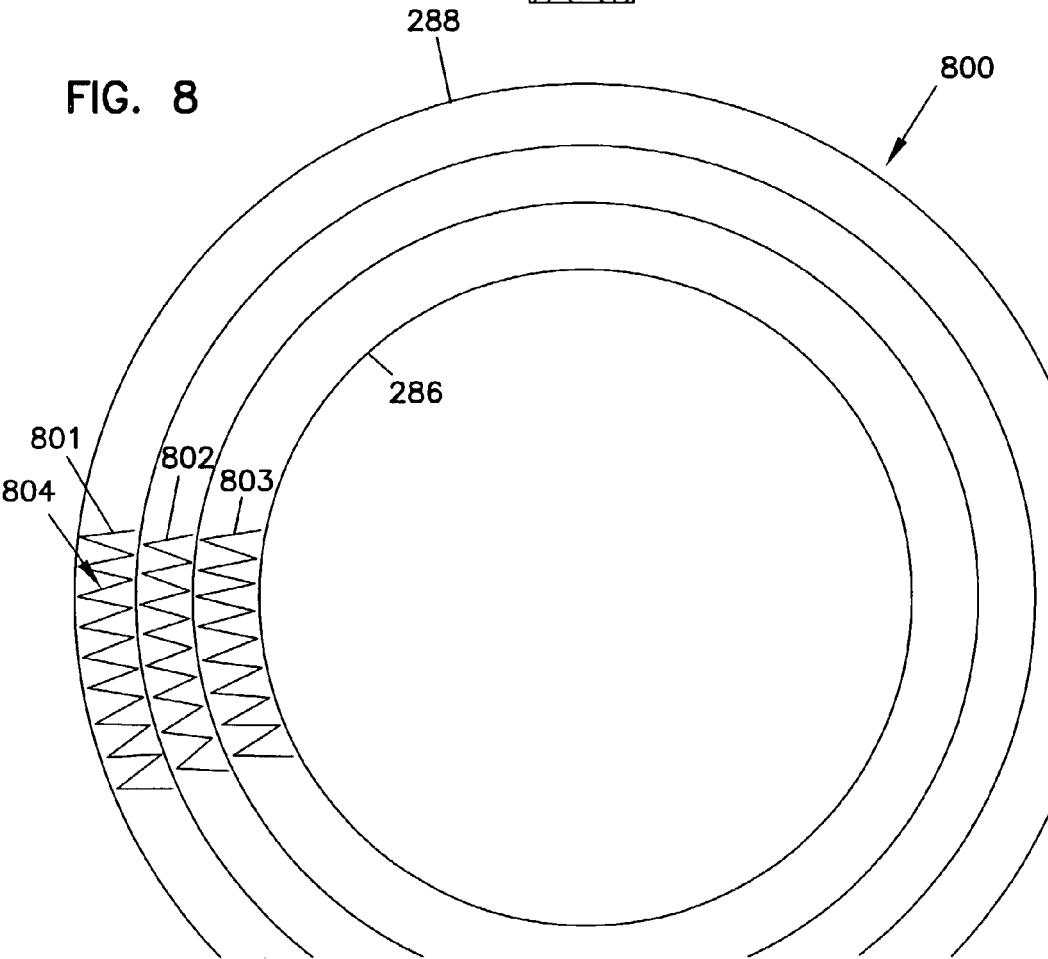
FIG. 8 is a partial view of a cross section of a mist collection cartridge containing three layers of pleated media, the media containing layers of fine fiber.

Alternately stated, air flow is generally directed from an upstream side to a downstream side of the filter wraps, and for the "forward" flow arrangement depicted in FIG. 8, the upstream side is indicated generally at 445 and the downstream side generally at 446. Analogous systems to those described herein (of course reversed with respect to physical direction of layer gradient) could be constructed for reverse flow (inside to outside) systems.

Preferred pre-filter wraps, such as pre-filter wrap 421, according to the present invention generally include one, two or three layers of filter media therein. These layers will be generally characterized herein as layer I, layer II and layer III. For pre-filter wrap 421: layer I is generally indicated at reference no. 250, FIGS. 4–5; layer II at reference no. 451; and, layer III at reference no. 452. In general, layer I is the most upstream stage, layer II an intermediate stage, and layer III is a most downstream stage of the filter media. For the particular preferred arrangement shown, layer I, reference no. 250, comprises a stage having two regions and types of media, indicated at 456 and 457, therein. It should be understood that any of layers I, II and III could comprise more than one layer of material. In some instances, the more than one layer could be of the same material, and in other preferred systems layers in a Stage could comprise layers of different materials. The preferred arrangement, depicted in FIGS. 4–5, is one wherein: layer I is a multilayered region provided with a preferred gradient, as characterized hereinbelow; layer II is an intermediate region of one layer of preferred material; and layer III is a downstream region comprising one layer of material. Preferred characteristics and materials for the various stages, are as follows.

Although alternate applications are possible, preferred mist collector systems utilizing principles according to the present invention are constructed and arranged for preferred operation with the following parameters:

1. A face velocity during collection on the order of at least 80 fpm, typically less than 140 fpm, preferably 100 to 120 fpm, face velocity being the volume flow of air divided by surface area of the outside of the pre-filter wrap.
2. A steady state operation achieved within a period of 1 to 7 days of continuous operation and lasting, without increase substantially above about a 4 inch ΔP, for a period of at least 6 weeks, preferably at least 4 months (120 days) and more preferably at least 5–6 months (150–180 days).
3. A capability of collecting and draining, during operation, a volume of liquid on the order of at least 50 mg/m$^3$ (of air passing through the filter), typically at least 75 mg/m$^3$ and in some instances 175 mg/m$^3$ or higher (for example 200–300 mg/m$^3$. (Of course the same materials may be used in operations involving lower load rates.)

Figure 6:
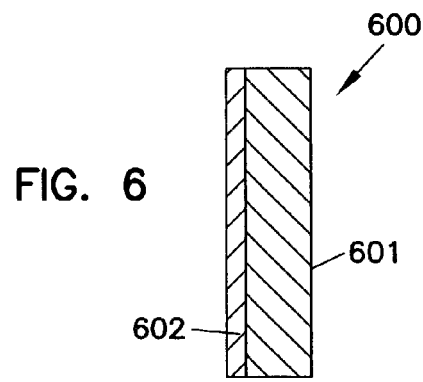
FIG. 6 is a partial view of a cross section of a single sided fine fiber containing media.
Figure 7:
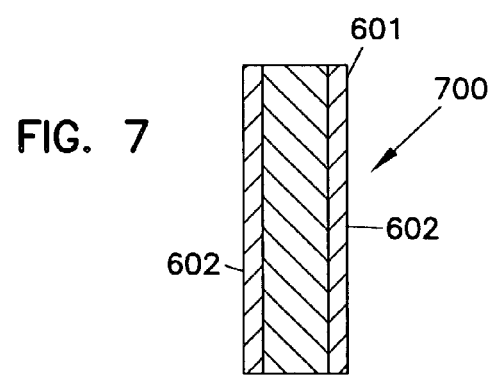
FIG. 7 is a partial view of a cross section of a two-sided fine fiber containing media.

Turning now to FIG. 6, a single side media layer 600, comprising a first layer of fine fiber 602 intimately contacted with the second layer of the substrate 601. The fine fiber layers commonly substantially more thin than the substrate layer and comprise fibers of a smaller dimension. In the media layer 600, the gaseous stream first impacts the fine fiber layer 602. Each mist particle, as small as 0.1 micron contacts the fine fiber layer having fiber size and pore size adapted to trap mist particles. Upon contact, the mist particulates begin to coalesce into larger particular, then penetrate the fine fiber layer and subsequently are absorbed in the media layer for draining from the media layer under the influence of gravity. Similarly, in FIG. 7, a double sided media layer 700 of the invention is shown containing two layers of fine fiber (601 and 602) on one layer of media. In these figures, the fine fiber layer(s) and the media layer are selected to capture mist particulates, coalesce the mist particulates and pass the coalesced liquid into the media layer for drainage under the influence of gravity. Filter cartridges manufactured with the fine fiber media of the invention are configured to accumulate liquid in the liquid accumulating end cap of the cartridge for mobile using conventional liquid handling means.

FIG. 8 is a partial cross-section of a fine fiber media containing cartridge 800 of the invention. In FIG. 8, three layers of pleated fine fiber media (801, 802, and 803) are shown. The pleated media are held between the perforated metal liners (286 and 288) that mechanically secure the media within the cartridge and position the media in the gaseous stream to efficiently removed mist particulate. The pleats in the media are maintained using pleat separating means between the pleated sections and often by forming dimples and the end of each pleat that act to maintain separation between pleated sections. We have found that the use of two, three or more separate layers of pleated fine fiber, depending on fine fiber add-on, can result in substantially improved mist removal and increased HEPA lifetime.

With respect to operation, the following principles and observations will be of interest. In general, products characterized as above can be used in either 100% aqueous fluids, 100% oil applications or with water soluble or aqueous emulsion cutting fluids. The system is very flexible, and was particularly designed to be capable of addressing very vigorous applications; for example, 100% oil applications involving chip blasters directing pressurized oil onto the workpiece, at pressures on the order of 300 psi or greater, for example, 300 psi–1,000 psi, (in order to flush and remove metal shavings from the cutting activity). The systems as characterized above will, in general, be useable and operable in many instances regardless of the type of metal involved (steel, brass, iron, aluminum, stainless steel, etc.) the relative temperature of the system, and the nature of the cutting fluid and its method of application. The pre-wrap will also extend the useful life of the downstream cartridge and/or HEPA filters.

When the cutting fluid involves an oil-water mix or emulsion, an effect to be taken into consideration with respect to filter design relates to the fact that the water will to some extent evaporate. This not only reduces average particle size but, in some instances, can leave the airborne mist as a substantially higher percent, by weight, of oil than was present in the original cutting fluid. That is, during the operation, the water will tend to evaporate whereas the oil will not, changing the relative percent, by weight, of each present in the airborne mist. Indeed in some instances of heavy cutting fluid applications and relatively high temperatures, the resulting airborne mist from an industrial process using a cutting fluid containing 8–15% oil, will simulate an airborne mist of nearly 100% oil.

Experimental

Figure 9:
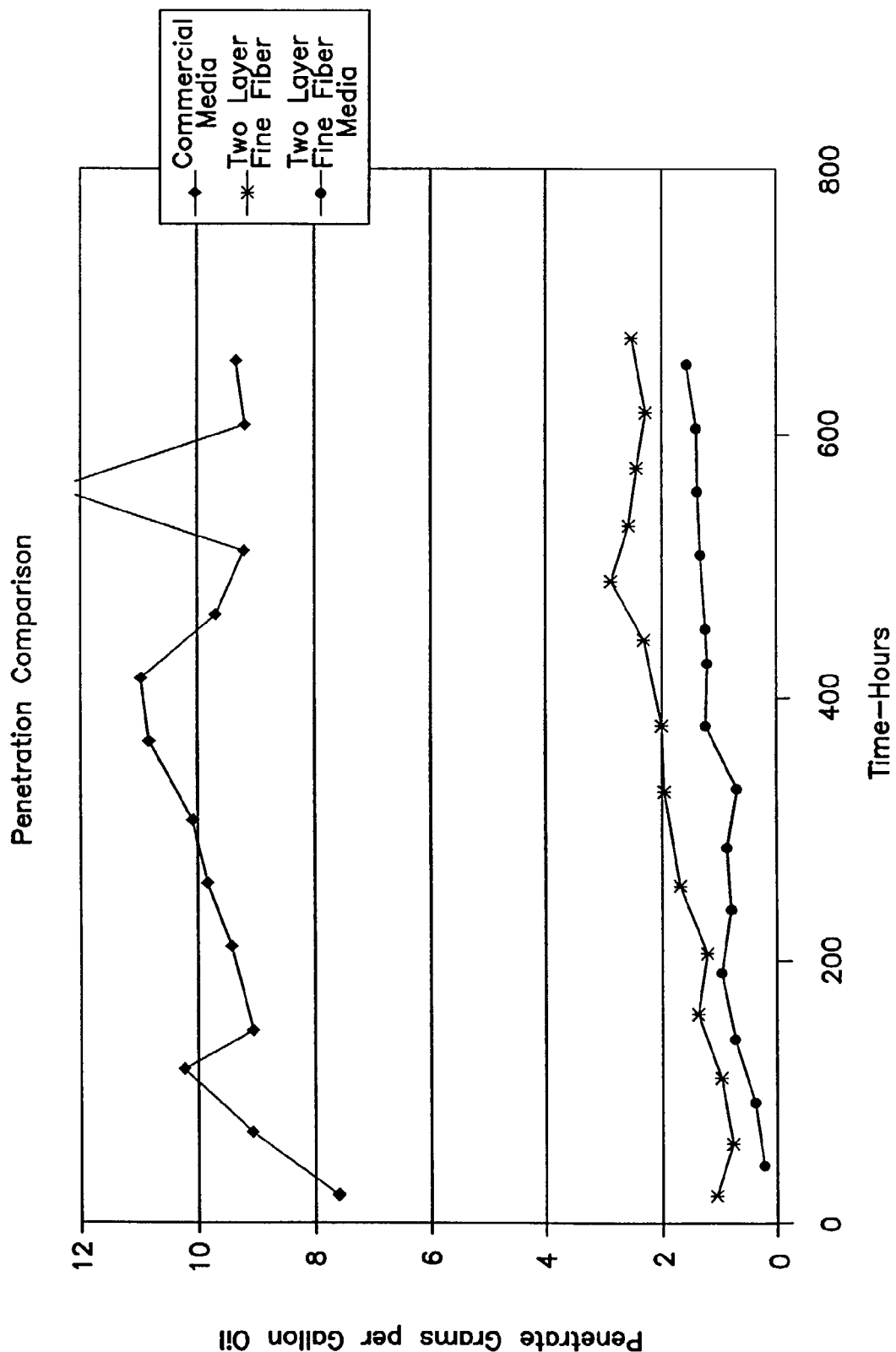
FIG. 9 is a graphical representation of data showing that the filter cartridge of the invention using the improved media can pass substantially reduces amounts of mist particulate through the media layer.

The ability of one or two layers of the fine fiber containing media of the invention, to prevent oil mist penetration in comparison to conventional media without fine fiber, was measured by passing a gaseous stream containing oil mist particulate through filters made using conventional media or fine fiber containing media. The filters made with the fine fiber containing media displayed substantially increased mist removal properties, when compared to conventional media (see the data in the graphical representation in FIG. 9).

Construction Methods—3 layer Ultra Web cartridge test unit prototypes The Dryflo test system uses cartridge # P19-1023 which is a cylindrical filter 19″ diameter and 20″ tall. The prototype media consists of three layers of 1.1″ pleat depth formed as concentric rings around each other. Total filtration area is approximately 210 square feet. The special media used was obtained form Hollingsworth & Vose Co., 112 Washington Street, East Walpole, Mass., 02032. The media is similar to grade FA-387, which consists of polyester fiber with resin binder. The following physical properties apply—basis weight of 75 lbs-3000 ft$^{-2}$, Frazier permeability of 260 ft/min., and a thickness of 0.025 inches. Fine fiber having a fiber diameter of about 0.25 micron and a basis weight in the layer of about 0.08 lbs-3000 ft$^{-2}$ was applied to both sides of the media to increase filtration efficiency (ASTM-1215-89) to between 85 and 95%.

Laboratory Oil Mist Test System

A lab test system was assembled to spray oil mist into a standard Dryflo unit. We used a Dryflo DMC-C, which is rated for an airflow of 1000 CFM. A motorized air damper was installed on the outlet ducting, which allowed a computer to maintain 1000 CFM as the filter was loaded with oil mist. An absolute housing was also installed on the downstream side of the Dryflo to capture oil that penetrated the unit. This fiberglass media would be weighed periodically during the test to determine penetration of oil.

The metalworking cutting oil used for this test was purchased from Lube-Tech, 2420 West County Road C, Roseville, Minn. Kleen-Kut #1 was selected as the test oil because it was a general-purpose oil that was odorless, transparent, and non-staining, and was also environmentally safe and non-hazardous.

The oil was sprayed with a Spraying Systems nozzle #SU1A using fluid cap #1650 and an air cap #64. This type of nozzle would deliver an average of 3 gallons per day of oil. Compressed air of 80 PSI was controlled at all times to maintain constant oil atomization. The nozzle was centered inside the 8″ diameter inlet ducting at a distance of 36 inches from the Dryflo housing.

A commercially available cartridge filter units in a mist collection test system similar to that shown in FIGS. 1 and 6, were tested for mist collection. The cartridge filter units were then tested with a two sided fine fiber media of the invention. In the testing of these units the amount of oil collected on the HEPA filter, in a last filter stage down stream from the cartridge, was measured as a characterization of the ability of the media of the invention to remove increased amounts of mist, compared to units without the inventive media, without loss in lifetime.

Portable Accelerated Test System

The Portable Accelerated Test System (PATS) was built for field-testing to eliminate variable data from one month to another. If two tests were run at different time periods, plant operating conditions will change such as run time, heavy vs. light loading, temperature, relative humidity, etc. which affects pressure loading rate to the test filters. The PATS unit allows us to run two filters at the same time so that we can compare the performance of the test sample directly against a baseline filter.

Two standard Torit Dryflo systems were obtained to accommodate 1000 CFM in each unit. The inlet ducting is common to both units and is split before entering the Dryflo's. Each DryFlo has an independent flow control to maintain 1000 CFM regardless of filter restriction. This maintains constant contaminant loading to each filter during the life of the test period. This PATS system was installed at a local machine shop where heavy levels of oil mist and oil smoke were generated.

Pressure drop was recorded for system one (standard filter) vs. system two (test filter). Obviously, a lower pressure would be preferred for the test filter assuming equivalent efficiency. To measure efficiency, each system also had a HEPA installed downstream of the main filter to remove remaining oil mist. The HEPA filters were weighed before and after the test to obtain an overall efficiency for the main filter—a lower weight on the HEPA for a given test period would indicate better efficiency.

The use of the media layer of the invention resulted in substantial increase in the amount of mist oil removed by the media of the invention. This increased removal resulted in reduced oil accumulation (see Table 1 below) in the final HEPA filter and an extended lifetime for the HEPA filter.

TABLE 1

| PENETRATION TO HEPA Oil Weight Comparison | | | | |
|---|---|---|---|---|
| Standard Filter Cartridge | | Standard Cartridge with Fine Fiber Media | | HEPA Filter Life Increase |
| 1st HEPA | 2.8 lbs. | 1st HEPA | 0.8 lb. | 3.5 X |
| 2nd HEPA | 2.2 lbs. | 1st HEPA | 0.8 lb. | 2.75 X |
| 3rd HEPA | 2.2 lbs. | 1st HEPA | 0.8 lb. | 2.75 X |
| Total | 7.2 lbs. | | 2.4 lbs. | 3.00 X |

The above characterized filter system will in general be preferred to such alternative arrangements as electrostatic precipitators or centrifugal separators, due primarily to cost, ease of installation and operation, and based on cost/efficiency concerns. It is noted that, however, the principles can be applied in some instances in combination with other filtering approaches. In general, while media according to the present invention can be provided with (initially) electrostatic charge, such is not necessary for good, initial efficiency or overall preferred efficient operation. Thus, neutral media is useable.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A mist collection filter comprising a filter media, the filter media comprising:
    (a) a mist polish layer having a first end and a second end, said layer comprising a substantially planar sheet-like substrate having a first side and a second side, said layer having a plurality of pleats formed therein and extending from said first end to said second end, the layer comprising a substrate having a pore size less than 400 microns, a permeability of about 50 to 1000 feet per minute; a thickness of less than 0.05 inch and a basis weight greater than 30 lb.-3000 ft$^{-2}$;
    (b) at least one of said first side or said second side of the substrate, substantially covered by a polymeric fine fiber layer, the layer having a thickness of about 0.2 to 100 microns, the fiber having a diameter of about 0.01 to about 5 microns and said media layer being secured in said filter wherein the filter has the capacity of collecting and draining in a liquid form at least 50 mg/m$^3$ of mist.

2. The filter of claim 1 wherein the filter media is cylindrical.

3. The filter of claim 1 wherein the filter media is a flat panel having a permeability of about 130 to 450 feet per minute.

4. The filter of claim 1 wherein the filter is configured for use in a multistage filter structure used in removing an entrained mist, comprising oil, water or mixtures thereof, from an air stream.

5. The filter of claim 4 wherein the filter comprises two or more layers of the pleated fine fiber containing media, one layer positioned upstream of another layer in the filter.

6. The filter of claim 4 wherein the filter comprises three layers of the pleated fine fiber containing media, each layer positioned such that a gas stream passes through each layer.

7. The filter of claim 1 wherein the sheet-like substrate has a basis weight of about 40 to 129 lbs-3000 ft$^{-2}$, a thickness of about 0.005 to 0.08 inch and the thickness of the fine fiber layer comprises about 0.5 to about 50 microns, and the fine fiber layer is intimately contacted with the media.

8. The filter of claim 1 wherein the fine fiber comprises a condensation polymer.

9. The filter of claim 8 wherein the condensation polymer comprises a nylon polymer.

10. The filter of claim 9 wherein the condensation polymer additionally comprises a resinous additive comprising a phenolic oligomer having a molecular weight of about 500 to 3000 wherein the additive is miscible in the condensation polymer.

11. The filter of claim 9 wherein the nylon polymer comprising a homopolymer.

12. The filter of claim 1 wherein the filter comprises an outerwrap filter having a porosity and permeability greater than the filter.

13. The filter of claim 12 wherein the outerwrap comprises a foam layer.

14. The filter of claim 12 wherein the outerwrap comprises a fiber layer.

15. The filter of claim 1 wherein the substrate comprises a non-woven comprising cellulose and a polyester.

16. A sheet-like filter media for mist collection comprising a fine fiber layer in intimate contact with a substantially planar sheet-like mist polish substrate, said substrate having a pore size less than about 400 microns, a permeability about 150 to 400 feet per minute, a thickness of less than about 0.05 inch and a basis weight greater than 40 lbs-3000 ft$^{-2}$; said sheet-like substrate having a first side and a second side, at least one of said first side and said second side of the sheet-like substrate substantially covered by a layer of polymeric fine fiber, the fiber having a diameter of about 0.1 to about 5 microns, the layer having a thickness of about 0.2 to 100 microns wherein the filter has the capacity of collecting and draining in a liquid form at least 50 mg/m$^3$ of mist.

17. The media of claim 16 wherein the sheet-like substrate has a basis weight of about 40 to 120 lbs-3000 ft$^{-2}$, a thickness of about 0.005 to 0.08 inch and the thickness of the fine fiber layer comprises about 0.5 to about 50 microns, and the fine fiber layer is intimately contacted with the media.

18. The media of claim 16 wherein the fine fiber comprises a nylon polymer.

19. The media of claim 16 wherein the fine fiber comprises a polymer and a resinous additive comprising an oligomer having a molecular weight of about 500 to 3000 and an aromatic character wherein the additive is miscible in the polymer.

20. A mist collection filter comprising a filter media layer, the filter media comprising:
    (a) a mist polish layer having a first end and a second end, said media layer comprising a substantially planar sheet-like substrate having a first side and a second side, said layer having a plurality of pleats formed therein and extending from said first end to said second end, the layer comprising a media having a pore size less than 400 microns, a permeability of about 150 to 400 feet per minute; a thickness of less than 0.05 inch and a basis weight greater than 40 lbs-3000 ft$^{-2}$;
    (b) said first side and said second side of the sheet-like substrate, at least partially covered by a polymeric fine fiber layer, the layer having a thickness of about 0.1 to 100 microns, the fiber having a diameter of about 0.01 to about 5 microns and said media layer being secured in said filter wherein the filter has the capacity of collecting and draining in a liquid form at least 50 mg/m$^3$ of mist.

21. The filter of claim 20 wherein the filter media is cylindrical.

22. The filter of claim 20 wherein the filter media is a flat panel.

23. The filter of claim 20 wherein the filter is configured for use in a multistage filter structure used in removing an entrained mist from an air stream.

24. The filter of claim 23 wherein the filter comprises two or more layers of the pleated fine fiber containing media, one layer positioned upstream of another layer in the filter.

25. The filter of claim 24 wherein the filter comprises three layers of the pleated fine fiber containing media.

26. The filter of claim 20 wherein the sheet-like substrate has a basis weight of about 40 to 120 lbs-3000 ft$^{-2}$, a thickness of about 0.005 to 0.08 inch and the thickness of the fine fiber layer comprises about 0.5 to about 50 microns, and the fine fiber layer is intimately contacted with the media.

27. The filter of claim 20 wherein the fine fiber comprises a condensation polymer.

28. The filter of claim 27 wherein the condensation polymer comprises a nylon polymer.

29. The filter of claim 28 wherein the condensation polymer additionally comprises a resinous additive comprising a phenolic oligomer having a molecular weight of about 500 to 3000 wherein the additive is miscible in the condensation polymer.

30. The filter of claim 28 wherein the nylon polymer comprising a homopolymer.

31. The filter of claim 20 wherein the filter comprises an outerwrap filter having a porosity and permeability greater than the filter.

32. The filter of claim 31 wherein the outerwrap comprises a foam layer.

33. The filter of claim 32 wherein the outerwrap comprises a fiber layer.

34. The filter of claim 20 wherein the substrate comprises a non-woven comprising cellulose and a polyester.

35. A sheet-like filter media for mist collection comprising a fine fiber layer in intimate contact with a substantially planar sheet-like mist polish substrate, said substrate having a pore size less than about 400 microns, a permeability about 150 to 400 feet per minute, a thickness of less than about 0.05 inch and a basis weight greater than 40 lbs-3000 ft$^{-2}$; said sheet-like substrate having a first side and a second side, said first side and said second side of the sheet-like substrate substantially covered by a layer of polymeric fine fiber, the fiber having a diameter of about 0.1 to about 5 microns, the layer having a thickness of about 0.1 to 100 microns wherein the filter has the capacity of collecting and draining in a liquid form at least 50 mg/m$^3$ of mist.

36. The media of claim 35 wherein the sheet-like substrate has a basis weight of about 40 to 120 lbs-3000 ft$^{-2}$, a thickness of about 0.005 to 0.08 inch and the thickness of the fine fiber layer comprises about 0.5 to about 50 microns, and the fine fiber layer is intimately contacted with the media.

37. The media of claim 35 wherein the fine fiber comprises a nylon polymer.

38. The media of claim 35 wherein the fine fiber comprises a nylon polymer, and a resinous additive comprising an oligomer having a molecular weight of about 500 to 3000 and an aromatic character wherein the additive is miscible in the condensation polymer.

39. A mist collection filter comprising a filter media, the filter media comprising:
  (a) a mist polish layer having a first end and a second end, said layer comprising a substantially planar sheet-like substrate having a first side and a second side, said layer having a plurality of pleats formed therein and extending from said first end to said second end, the layer comprising a substrate having a pore size less than 400 microns, a permeability of about 50 to 1000 feet per minute; a thickness of less than 0.05 inch and a basis weight greater than 30 lb.-3000 ft$^{-2}$;
  (b) at least one of said first side or said second side of the substrate, substantially covered by a polymeric fine fiber layer, the layer having a thickness of about 0.2 to 100 microns, the fiber having a diameter of about 0.01 to about 5 microns and said media layer being secured in said filter wherein the filter has the capacity of collecting at least 50 mg/m$^3$ of mist and draining the mist in a liquid form;
  wherein the filter comprises an outerwrap filter having a porosity and permeability greater than the filter.

40. The filter of claim 1 wherein the fine fiber comprises an addition polymer.

41. The filter of claim 1 wherein the fine fiber comprises a polymer crosslinked using a crosslinking agent.

42. The filter of claim 20 wherein the fine fiber comprises an addition polymer.

43. The filter of claim 20 wherein the fine fiber comprises a polymer crosslinked using a crosslinking agent.

\* \* \* \* \*